US011838925B2

(12) United States Patent
Lee et al.

(10) Patent No.: US 11,838,925 B2
(45) Date of Patent: Dec. 5, 2023

(54) METHOD AND APPARATUS FOR CLEARING RETRANSMISSION RESOURCES BASED ON ACKNOWLEDGEMENT

(71) Applicant: LG ELECTRONICS INC., Seoul (KR)

(72) Inventors: Youngdae Lee, Seoul (KR); Seungmin Lee, Seoul (KR); Giwon Park, Seoul (KR); Hanbyul Seo, Seoul (KR); Jongyoul Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/967,216

(22) Filed: Oct. 17, 2022

(65) Prior Publication Data

US 2023/0046279 A1 Feb. 16, 2023

Related U.S. Application Data

(63) Continuation of application No. 17/683,950, filed on Mar. 1, 2022, now Pat. No. 11,503,631, which is a
(Continued)

(51) Int. Cl.
*H04W 72/23* (2023.01)
*H04L 1/1812* (2023.01)
(Continued)

(52) U.S. Cl.
CPC .......... *H04W 72/23* (2023.01); *H04L 1/1812* (2013.01); *H04L 5/0053* (2013.01); *H04W 28/26* (2013.01); *H04W 80/02* (2013.01)

(58) Field of Classification Search
None
See application file for complete search history.

(56) References Cited

U.S. PATENT DOCUMENTS 11,057,903 B2 7/2021 Agiwal ................. H04W 72/10
2020/0260345 A1 8/2020 Phuyal ............. H04W 36/0079
(Continued)

FOREIGN PATENT DOCUMENTS

WO 2017-075798 A1 5/2017
WO 2019066558 A1 4/2019

OTHER PUBLICATIONS

Huawei, HiSilicon, "Consideration on resource allocation for PC5 CA", 3GPP TSG-RAN WG2 Meeting #101bis, Apr. 16-20, 2018, R2-1804635.
(Continued)

*Primary Examiner* — Hong S Cho
(74) *Attorney, Agent, or Firm* — BRYAN CAVE LEIGHTON PAISNER LLP

(57) ABSTRACT

A method and apparatus for clearing retransmission resources based on acknowledgement in a wireless communication system is provided. A first wireless device reserves multiple sets of resources for transmissions of multiple media access control (MAC) protocol data units (PDUs), transmits a first MAC PDU to a second wireless device using at least one resource from a first set of resources corresponding to the first MAC PDU among the multiple sets of resources, receives a positive acknowledgement for the first MAC PDU from the second wireless device, and clears remaining resources from the first set of resources corresponding to the first MAC PDU.

15 Claims, 19 Drawing Sheets

Related U.S. Application Data continuation of application No. PCT/KR2020/014762, filed on Oct. 28, 2020.

(60) Provisional application No. 62/927,084, filed on Oct. 28, 2019.

(51) Int. Cl.
  | | |
  |---|---|
  | *H04L 5/00* | (2006.01) |
  | *H04W 28/26* | (2009.01) |
  | *H04W 80/02* | (2009.01) |

(56) References Cited

U.S. PATENT DOCUMENTS

| | | | |
|---|---|---|---|
| 2021/0022139 A1 | 1/2021 | Shin | H04W 4/70 |
| 2022/0353020 A1* | 11/2022 | Ganesan | H04L 1/1887 |
| 2023/0171738 A1* | 6/2023 | Di Girolamo | H04W 72/20 |
| | | | 370/329 |

OTHER PUBLICATIONS

LG Electronics Inc., "Introduction of 5G V2X with NR Sidelink", R2-1913824, TSG RAN WG2 #107b, Chongqing, China, Oct. 11, 2019, See pp. 1-17.

Ericsson, "Discussion onSL Mode 1 Left issues", R2-1913325, TSG RAN WG2 #107b, Chongqing, China, Oct. 3, 2019, See pp. 1-6.

Huawei et al., "Discussion on HARQ Support for NR Sidelink", R2-1907414, TSG RAN WG2 #106, Reno, USA, May 2, 2019, See pp. 1-6.

Ericsson, "Support of HARQ Procedure Over Sidelink", R2-1913327, TSG RAN WG2 #107b, Chongqing, China, Oct. 3, 2019, See pp. 1-10.

3GPP TS 36.321 V1510, "3rd Generation Partnership Project;Technical Specification Group Radio Access Network; Evolved Universal Terrestrial Radio Access (E-UTRA);Medium Access Control (MAC) Protocol Specification", Release 15, (Sep. 2019).

U.S. Appl. No. 17/683,950, filed Mar. 1, 2022.

* cited by examiner

METHOD AND APPARATUS FOR CLEARING RETRANSMISSION RESOURCES BASED ON ACKNOWLEDGEMENT

CROSS-REFERENCE TO RELATED APPLICATIONS

This application is a Continuation of U.S. patent application Ser. No. 17/683,950, filed Mar. 1, 2022, which is a Continuation Bypass of International Application No. PCT/KR2020/014762, filed Oct. 28, 2020, which claims the benefit of U.S. Provisional Application No. 62/927,084, filed Oct. 28, 2019, the contents of which are all hereby incorporated by reference herein in their entirety.

TECHNICAL FIELD

The present disclosure relates to a method and apparatus for clearing retransmission resources based on acknowledgement.

BACKGROUND

Wireless communication systems generally aim to reduce costs for users and providers, improve service quality, and expand and improve coverage and system capacity. To achieve these goals, in some scenarios, wireless communication systems are designed to reduced cost per bit, increased service availability, flexible use of a frequency band, a simple structure, an open interface, and adequate power consumption of a terminal as an upper-level requirement.

SUMMARY

An aspect of the present disclosure is to provide a method and apparatus for clearing resources for retransmission of a data unit upon reception of an acknowledgement (ACK) for the data unit.

Another aspect of the present disclosure is to provide a method and apparatus for performing transmission of other data unit using resources corresponding to the other data unit.

In an aspect, a method performed by a first wireless device configured to operate in a wireless communication system is provided. The method includes reserving multiple sets of resources for transmissions of multiple media access control (MAC) protocol data units (PDUs), transmitting a first MAC PDU to a second wireless device using at least one resource from a first set of resources corresponding to the first MAC PDU among the multiple sets of resources, receiving a positive acknowledgement for the first MAC PDU from the second wireless device, and clearing remaining resources from the first set of resources corresponding to the first MAC PDU.

In another aspect, an apparatus for implementing the above method is provided.

The present disclosure can have various advantageous effects.

For example, retransmission of a data unit upon reception of a positive acknowledgement for the data unit can be avoided.

For example, a UE performing HARQ transmission of a packet by using radio resources can dynamically and efficiently allocate resources for retransmissions of the packet.

For example, a UE can dynamically and efficiently allocate resources for retransmissions of the packet by considering service characteristics and/or requirements.

For example, a UE can dynamically and efficiently allocate resources for retransmissions of the packet in particular when packets from various services are multiplexed into a single data unit.

For example, the system can provide dynamic and efficient allocation of resources for data retransmissions for a UE performing HARQ transmission.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
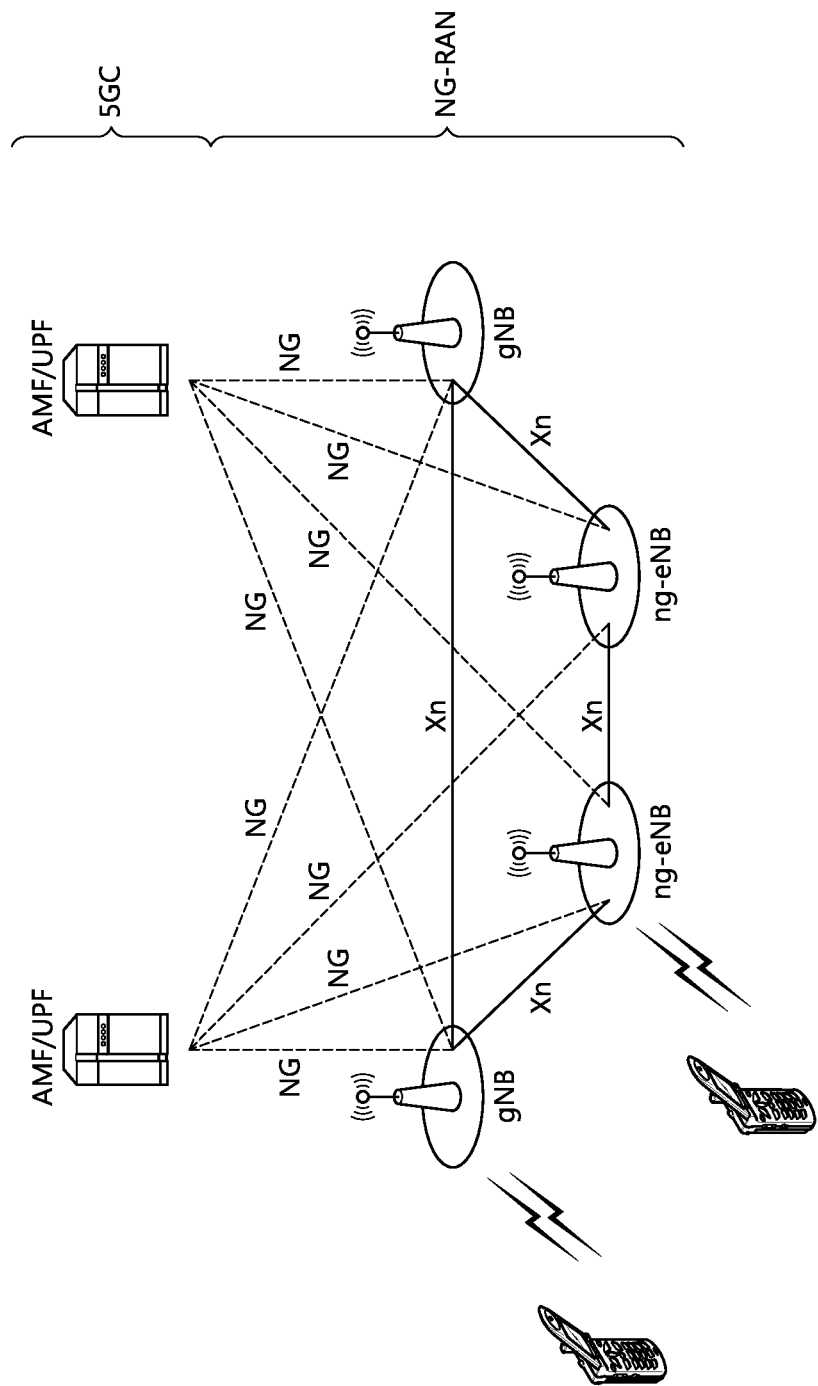
FIG. 1 shows an example of a wireless communication system to which implementations of the present disclosure can be applied.

In the present disclosure, "A or B" may mean "only A", "only B", or "both A and B." In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Vehicle-to-everything (V2X) communication is the communication of information from a vehicle to an entity that may affect the vehicle, and vice versa. Examples of V2X include vehicle-to-infrastructure (V2I), vehicle-to-network (V2N), vehicle-to-vehicle (V2V), vehicle-to-pedestrian (V2P), vehicle-to-device (V2D), and vehicle-to-grid (V2G).

V2X systems may be designed to achieve various objectives, such as road safety, traffic efficiency, and energy savings. V2X communication technology may be classified into two types, depending on the underlying technology: wireless local area network (WLAN)-based V2X, and cellular-based V2X.

The 3rd generation partnership project (3GPP) long-term evolution (LTE) is a technology designed to enable high-speed packet communications. In addition, the international telecommunication union (ITU) and 3GPP have developed technical standards for new radio (NR) systems. In doing so, technology is being identified and developed to successfully standardize the new radio access technology (RAT), in order to timely satisfy both urgent market needs, as well as longer-term goals and requirements set forth by the ITU radio communication sector (ITU-R) international mobile telecommunications (IMT)-2020 process. In some scenarios, NR is being designed to use any spectrum band ranging at least up to 100 GHz, which may be made available for wireless communications even in a more distant future.

The NR targets a technical framework addressing various usage scenarios, requirements, and deployment scenarios, such as, for example, enhanced mobile broadband (eMBB), massive machine-type-communications (mMTC), ultra-reliable and low latency communications (URLLC), etc.

In some systems, one or more technical features described below may be compatible with one or more technical standards, such as those used by a communication standard by the 3GPP standardization organization, a communication standard by the institute of electrical and electronics engineers (IEEE), etc. For example, the communication standards by the 3GPP standardization organization include LTE and/or evolution of LTE systems. The evolution of LTE systems includes LTE-advanced (LTE-A), LTE-A Pro, and/or 5G NR. The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a wireless communication system to which implementations of the present disclosure can be applied.

Referring to FIG. 1, the wireless communication system includes one or more user equipment (UE), a next-generation RAN (NG-RAN) and a 5th generation core network (5GC). The NG-RAN consists of at least one NG-RAN node. The NG-RAN node consists of at least one gNB and/or at least one ng-eNB. The gNB provides NR user plane and control plane protocol terminations towards the UE. The ng-eNB provides E-UTRA user plane and control plane protocol terminations towards the UE.

The 5GC includes an access and mobility management function (AMF), a user plane function (UPF) and a session management function (SMF). The AMF hosts various functions, such as, for example, non-access stratum (NAS) security, idle state mobility handling, evolved packet system (EPS) bearer control, etc. The UPF hosts various functions, such as, for example, mobility anchoring, protocol data unit (PDU) handling, etc. The SMF hosts various functions, such as, for example, UE IP address allocation, PDU session control, etc.

The gNBs and ng-eNBs are interconnected with each other by an interface, such as the Xn interface. The gNBs and ng-eNBs are also connected by NG interfaces to the 5GC, for example, to the AMF by the NG-C interface and to the UPF by the NG-U interface.

An example of a protocol structure between network entities described above is described. In the example of FIG. 1, layers of a radio interface protocol between the UE and the network (e.g. NG-RAN) may be classified into a first layer (L1), a second layer (L2), and a third layer (L3), for example based on the lower three layers of the open system interconnection (OSI) model.

Figure 2:
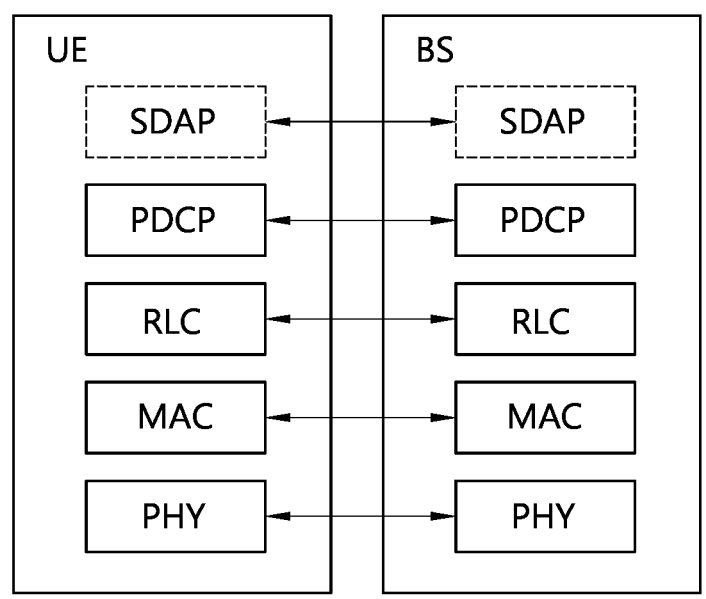
FIG. 2 shows a block diagram of an example of a user plane protocol stack to which implementations of the present disclosure can be applied.
Figure 3:
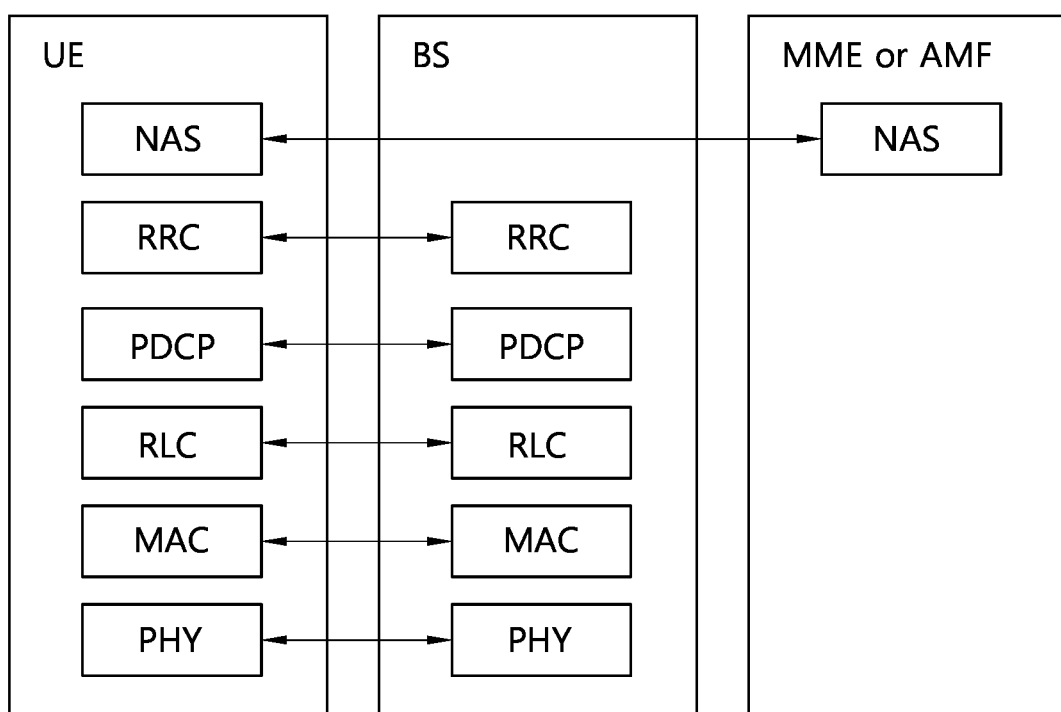
FIG. 3 shows a block diagram of an example of a control plane protocol stack to which implementations of the present disclosure can be applied.

FIG. 2 shows a block diagram of an example of a user plane protocol stack to which implementations of the present disclosure can be applied. FIG. 3 shows a block diagram of an example of a control plane protocol stack to which implementations of the present disclosure can be applied.

Referring to the examples of FIG. 2 and FIG. 3, a physical (PHY) layer belongs to L1. The PHY layer offers information transfer services to the media access control (MAC) sublayer and higher layers. For example, the PHY layer offers transport channels to the MAC sublayer, and data between the MAC sublayer and the PHY layer is transferred via the transport channels. Between different PHY layers, e.g., between a PHY layer of a transmission side and a PHY layer of a reception side, data is transferred via physical channels.

The MAC sublayer belongs to L2. The services and functions of the MAC sublayer include, for example, mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by dynamic scheduling, priority handling between logical channels of one UE by logical channel prioritization (LCP), etc. The MAC sublayer offers to the radio link control (RLC) sublayer logical channels.

The RLC sublayer belong to L2. In some implementations, the RLC sublayer supports different transmission modes, e.g., transparent mode (TM), unacknowledged mode (UM), and acknowledged mode (AM). The different transmission modes may help guarantee various quality of services (QoS) required by radio bearers. The services and functions of the RLC sublayer may depend on the transmission mode. For example, in some implementations, the RLC sublayer provides transfer of upper layer PDUs for all three modes, but provides error correction through ARQ for AM only. In some implementations, such as implementations compatible with LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). In some implementations, the NR does not support concatenation of RLC SDUs. The RLC sublayer offers RLC channels to the packet data convergence protocol (PDCP) sublayer.

The PDCP sublayer belongs to L2. The services and functions of the PDCP sublayer for the user plane include, for example, header compression and decompression, transfer of user data, duplicate detection, PDCP PDU routing, retransmission of PDCP SDUs, ciphering and deciphering, etc. The services and functions of the PDCP sublayer for the control plane include, for example, ciphering and integrity protection, transfer of control plane data, etc.

The service data adaptation protocol (SDAP) sublayer belongs to L2. In some implementations, the SDAP sublayer is only defined in the user plane. The services and functions of SDAP include, for example, mapping between a QoS flow and a data radio bearer (DRB), and marking QoS flow ID (QFI) in both DL and UL packets. The SDAP sublayer offers QoS flows to 5GC.

A radio resource control (RRC) layer belongs to L3. In some implementations, the RRC layer is only defined in the control plane. The RRC layer controls radio resources between the UE and the network. For example, the RRC layer exchanges RRC messages between the UE and the BS. The services and functions of the RRC layer include, for example, broadcast of system information related to access stratum AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

As such, in some implementations, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. In some scenarios, setting the radio bearer may include defining the characteristics of the radio protocol layer and the channel for providing a specific service, and setting each specific parameter and operation method. Radio bearers may include signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the network. In some implementations, when the RRC connection is established between the RRC layer of the UE and the RRC layer of the network, the UE is in the RRC connected state (RRC_CONNECTED); and otherwise, the UE is in the RRC idle state (RRC_IDLE). In implementations compatible with NR, the RRC inactive state (RRC_INACTIVE) is additionally introduced. The RRC_INACTIVE state may be used for various purposes. For example, in some scenarios, massive machine-type communications (mMTC) UEs can be efficiently managed in RRC_INACTIVE. When specific conditions are satisfied, transitions can be made from one of the above three states to others.

Various operations may be performed according to the RRC state. For example, in RRC_IDLE, operations such as public land mobile network (PLMN) selection, broadcast of system information (SI), cell re-selection mobility, core network (CN) paging and discontinuous reception (DRX) configured by NAS may be performed. The UE may be allocated an identifier (ID) which uniquely identifies the UE in a tracking area. In some implementations, no RRC context is stored in the base station.

As another example, in RRC_CONNECTED, the UE has an RRC connection with the network. Network-CN connection (both C/U-planes) is also established for UE. In some implementations, the UE AS context is stored in the network and the UE. The RAN knows the cell which the UE belongs to, and the network can transmit and/or receive data to/from UE. In some implementations, network controlled mobility including measurement is also performed.

One or more operations that are performed in RRC_IDLE may also be performed in RRC_INACTIVE. However, in some implementations, instead of performing CN paging as in RRC_IDLE, RAN paging may be performed in RRC_INACTIVE. For example, in RRC_IDLE, paging for mobile terminated (MT) data is initiated by a core network and paging area is managed by the core network. In RRC_INACTIVE, paging may be initiated by NG-RAN, and RAN-based notification area (RNA) is managed by NG-RAN. Further, in some implementations, instead of DRX for CN paging configured by NAS in RRC_IDLE, DRX for RAN paging is configured by NG-RAN in RRC_INACTIVE. In some implementations, in RRC_INACTIVE, 5GC-NG-RAN connection (both C/U-planes) is established for UE, and the UE AS context is stored in NG-RAN and the UE. The NG-RAN may know the RNA which the UE belongs to.

The NAS layer is implemented above the RRC layer, as shown in the example of FIG. 3. The NAS control protocol performs various functions, such as, for example, authentication, mobility management, security control, etc.

Physical channels, for example as utilized by the PHY layer, may be modulated according to various modulation techniques utilizing time and frequency as radio resources. For example, the physical channels may consist of a plurality of orthogonal frequency division multiplexing (OFDM) symbols in time domain and a plurality of subcarriers in frequency domain A subframe may be implemented, which consists of a plurality of OFDM symbols in the time domain. A resource block may be implemented as a resource allocation unit, and each resource block may consist of a plurality of OFDM symbols and a plurality of subcarriers. In addition, each subframe may use specific subcarriers of specific OFDM symbols (e.g., the first OFDM symbol) of the corresponding subframe for a specific purpose, such as for a physical downlink control channel (PDCCH), e.g., an L1/L2 control channel. A transmission time interval (TTI) may be implemented as a basic unit of time, for example as used by a scheduler for resource allocation. The TTI may be defined in units of one or a plurality of slots, or may be defined in units of mini-slots.

Transport channels may be classified according to how and with what characteristics data are transferred over the radio interface. For example, DL transport channels include a broadcast channel (BCH) used for transmitting system information, a downlink shared channel (DL-SCH) used for transmitting user traffic or control signals, and a paging channel (PCH) used for paging a UE. As another example, UL transport channels include an uplink shared channel (UL-SCH) for transmitting user traffic or control signals and a random access channel (RACH) normally used for initial access to a cell.

Different kinds of data transfer services may be offered by the MAC sublayer. Different logical channel types may be defined by what type of information is transferred. In some implementations, logical channels may be classified into two groups: control channels and traffic channels.

Control channels are used for the transfer of control plane information only, according to some implementations. The control channels may include, for example, a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. In some implementations, the CCCH is used for UEs having no RRC connection with the network. The DCCH is a point-to-point bi-directional channel that transmits dedicated control information between a UE and the network. In some implementations, the DCCH is used by UEs having an RRC connection.

Traffic channels are used for the transfer of user plane information only, according to some implementations. The traffic channels include, for example, a dedicated traffic channel (DTCH). The DTCH is a point-to-point channel, dedicated to one UE, for the transfer of user information. In some implementations, the DTCH can exist in both UL and DL.

In some scenarios, mappings may be implemented between the logical channels and transport channels. For example, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. As another example, in UL, CCCH can be mapped to UL-SCH, DCCH can be mapped to UL-SCH, and DTCH can be mapped to UL-SCH.

Figure 4:
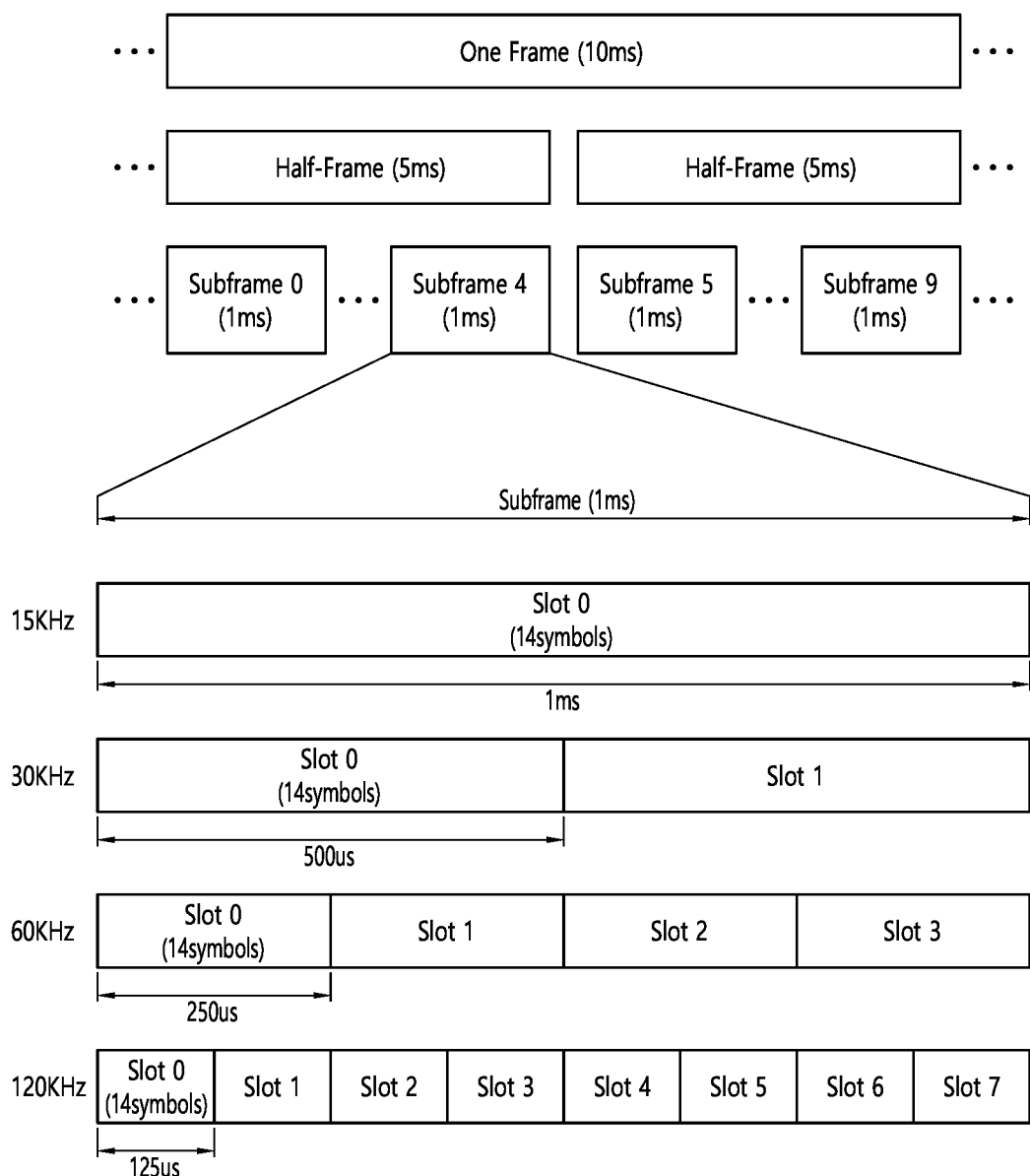
FIG. 4 shows a frame structure in a 3GPP based wireless communication system to which implementations of the present disclosure can be applied.

FIG. 4 shows a frame structure in a 3GPP based wireless communication system to which implementations of the present disclosure can be applied.

The frame structure shown in FIG. 4 is purely exemplary and the number of subframes, the number of slots, and/or the number of symbols in a frame may be variously changed. In the 3GPP based wireless communication system, OFDM numerologies (e.g., subcarrier spacing (SCS), TTI duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 4, downlink and uplink transmissions are organized into frames. Each frame has $T_f$=10 ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f = 2^u * 15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f=2^u*15$ kHz.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f=2^u*15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x}*N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 5:
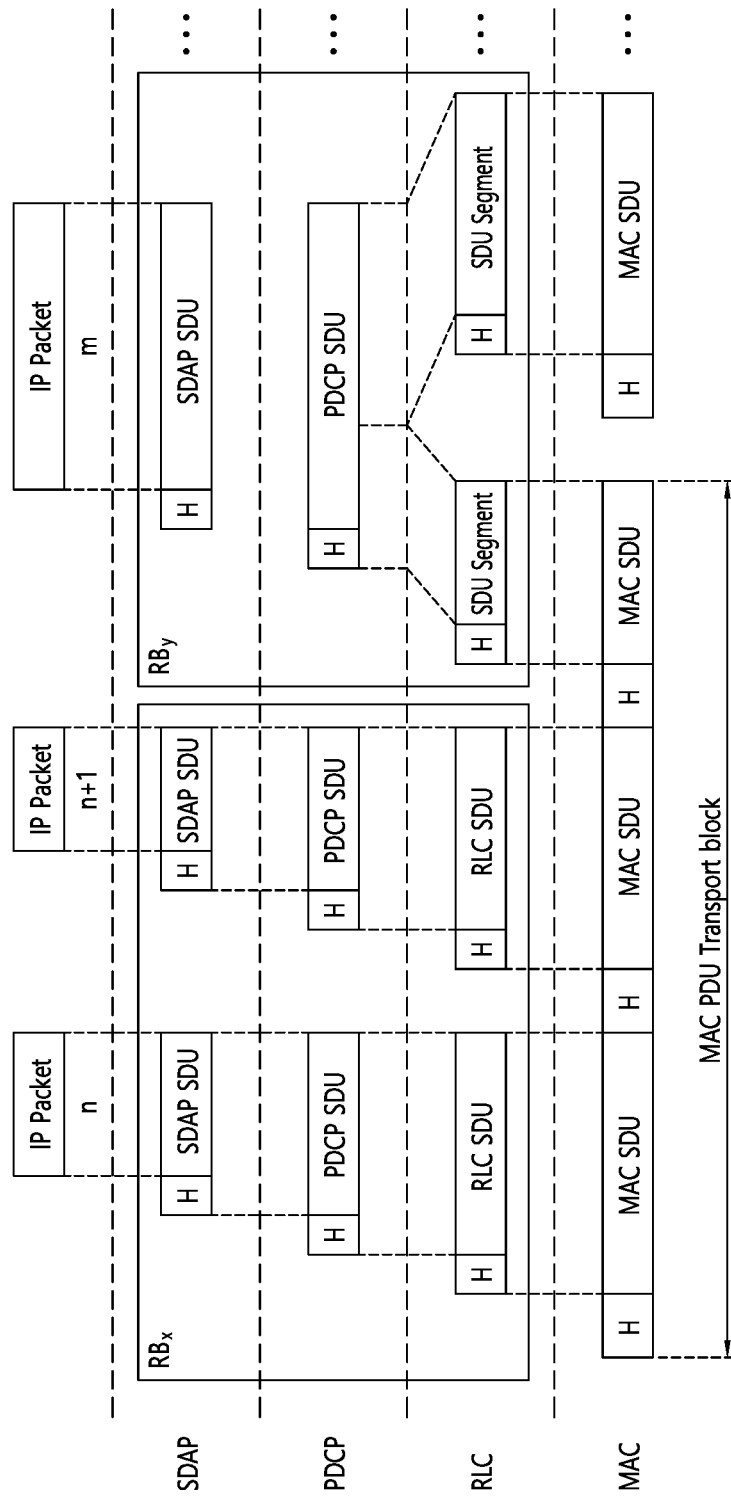
FIG. 5 shows a data flow example in the 3GPP NR system to which implementations of the present disclosure can be applied.

FIG. 5 shows a data flow example in the 3GPP NR system to which implementations of the present disclosure can be applied.

Referring to FIG. 5, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels physical uplink shared channel (PUSCH) and physical random access channel (PRACH), respectively, and the downlink transport channels DL-SCH, BCH and PCH are mapped to physical downlink shared channel (PDSCH), physical broadcast channel (PBCH) and PDSCH, respectively. In the PHY layer, uplink control information (UCI) is mapped to physical uplink control channel (PUCCH), and downlink control information (DCI) is mapped to physical downlink control channel (PDCCH). A MAC PDU related to UL-SCH is transmitted by a UE via a PUSCH based on an UL grant, and a MAC PDU related to DL-SCH is transmitted by a BS via a PDSCH based on a DL assignment.

Figure 6:
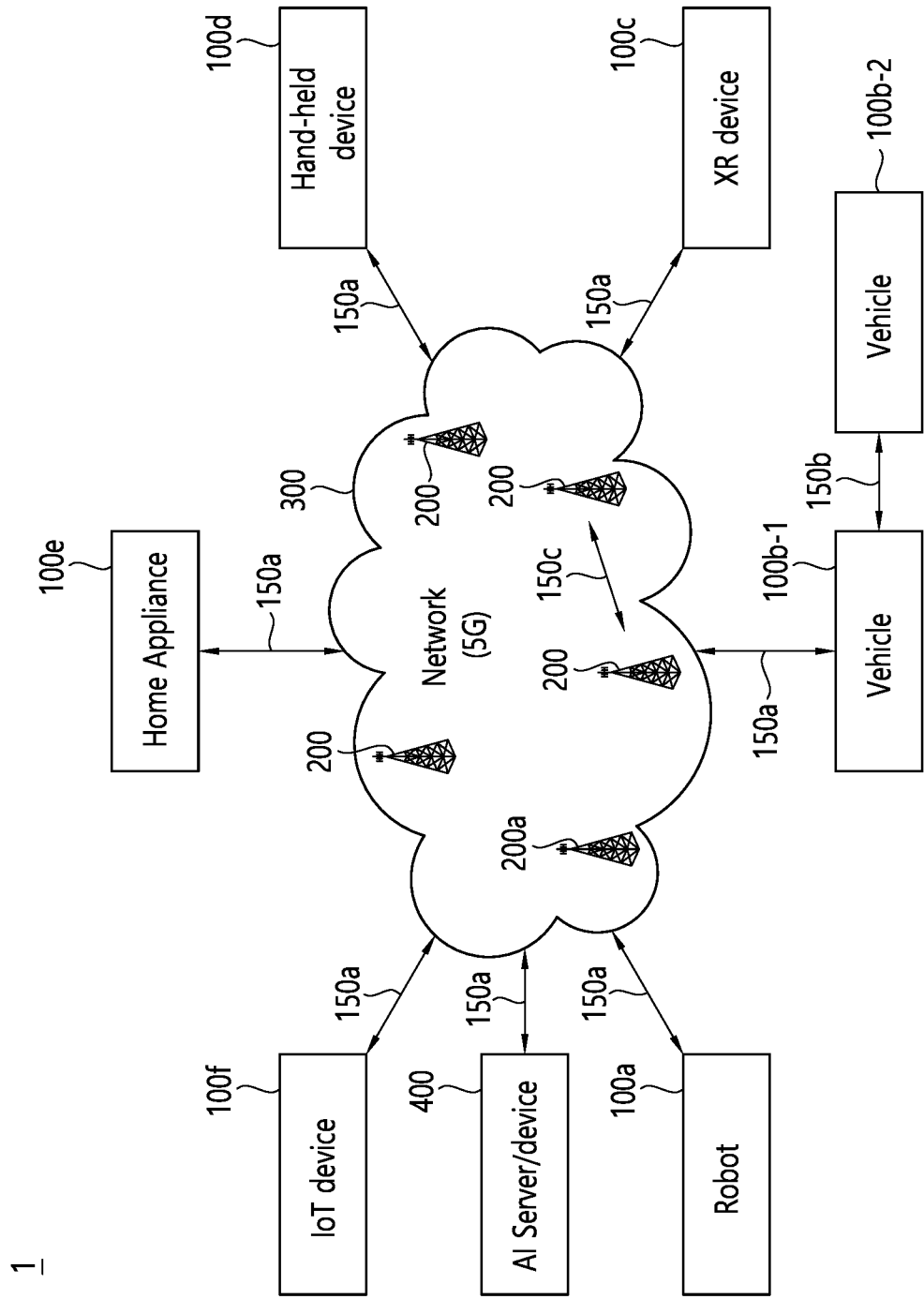
FIG. 6 shows an example of a communication system to which implementations of the present disclosure can be applied.

FIG. 6 shows an example of a communication system to which implementations of the present disclosure can be applied.

The 5G usage scenarios shown in FIG. 6 are only exemplary, and the technical features of the present disclosure can be applied to other 5G usage scenarios which are not shown in FIG. 6.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 6, the communication system 1 includes wireless devices 100a to 100f, base stations (BSs) 200, and a network 300. Although FIG. 6 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Figure 7:
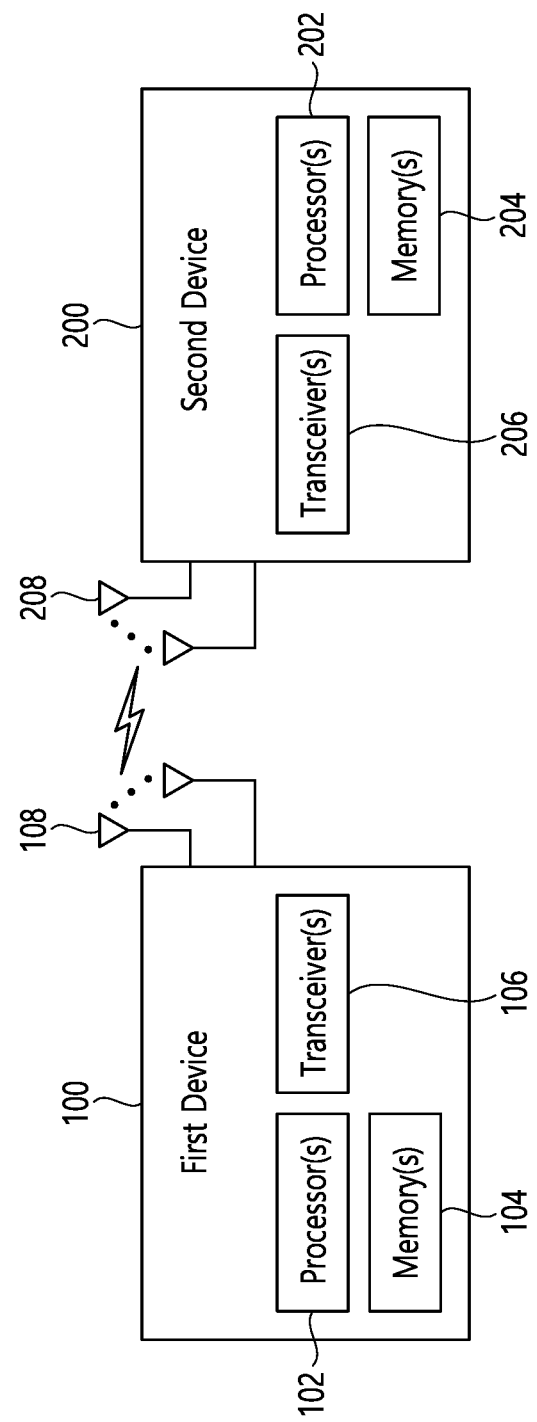
FIG. 7 shows an example of wireless devices to which implementations of the present disclosure can be applied.

FIG. 7 shows an example of wireless devices to which implementations of the present disclosure can be applied.

Referring to FIG. 7, a first wireless device 100 and a second wireless device 200 may transmit/receive radio signals to/from an external device through a variety of RATs (e.g., LTE and NR). In FIG. 7, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 6.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 8:
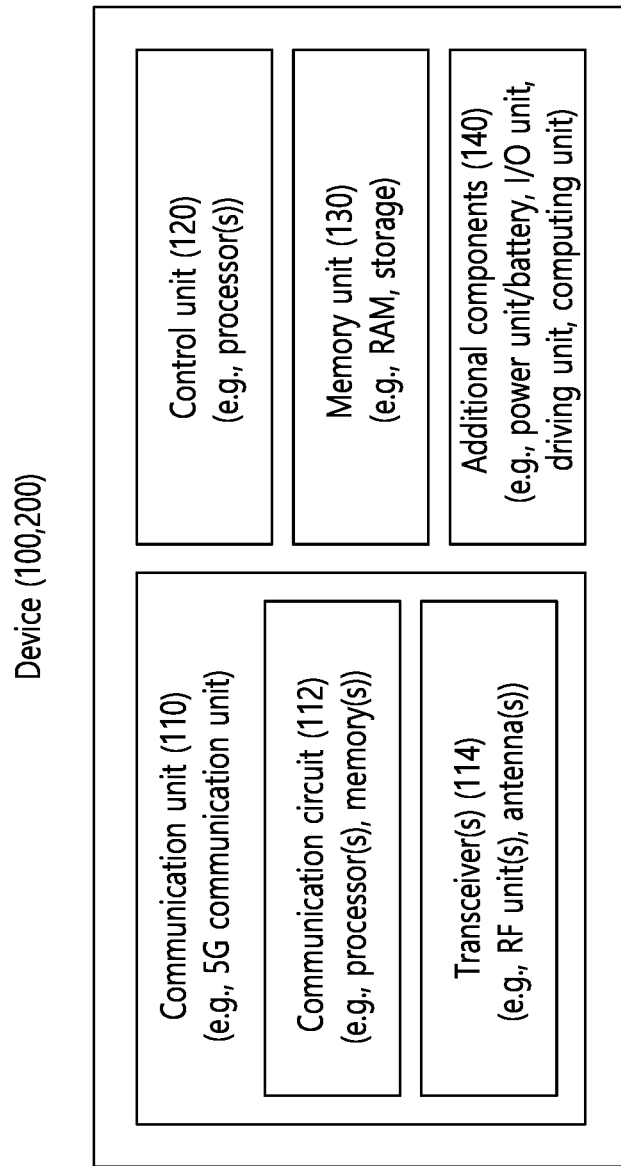
FIG. 8 shows an example of a wireless device to which implementations of the present disclosure can be applied.

FIG. 8 shows an example of a wireless device to which implementations of the present disclosure can be applied.

The wireless device may be implemented in various forms according to a use-case/service (refer to FIG. 6).

Referring to FIG. 8, wireless devices 100 and 200 may correspond to the wireless devices 100 and 200 of FIG. 7 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 7 and/or the one or more memories 104 and 204 of FIG. 7. For example, the transceiver(s) 114 may include the one or more transceivers 106 and 206 of FIG. 7 and/or the one or more antennas 108 and 208 of FIG. 7. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 6), the vehicles (100b-1 and 100b-2 of FIG. 6), the XR device (100c of FIG. 6), the hand-held device (100d of FIG. 6), the home appliance (100e of FIG. 6), the IoT device (100f of FIG. 6), a digital broadcast terminal, a hologram device, a public safety device, an MTC device, a medicine device, a FinTech device (or a finance device), a security device, a climate/environment device, the AI server/device (400 of FIG. 6), the BSs (200 of FIG. 6), a network node, etc. The wireless devices 100 and 200 may be used in a mobile or fixed place according to a use-example/service.

In FIG. 8, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 9:
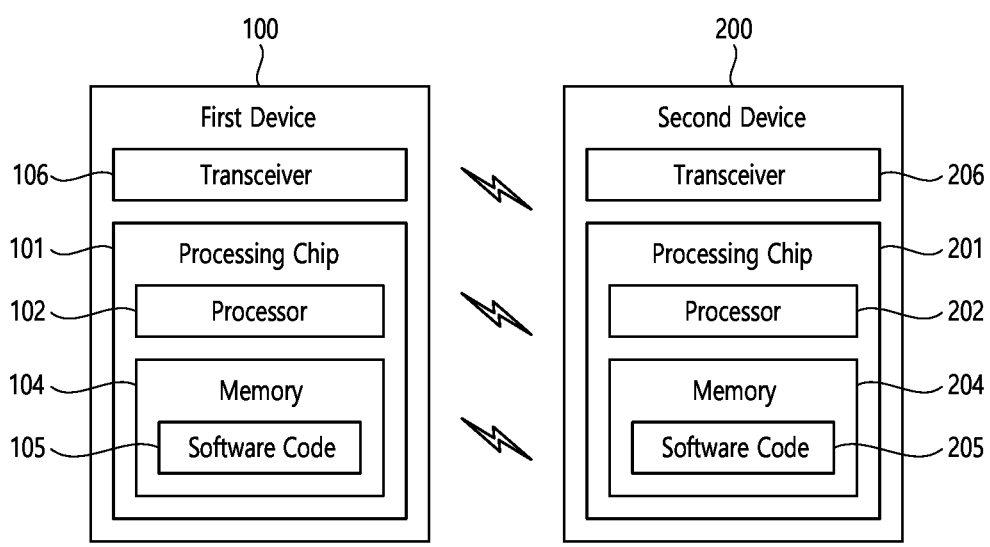
FIG. 9 shows another example of wireless devices to which implementations of the present disclosure can be applied.

FIG. 9 shows another example of wireless devices to which implementations of the present disclosure can be applied.

Referring to FIG. 9, wireless devices 100 and 200 may correspond to the wireless devices 100 and 200 of FIG. 7 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such as a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 10:
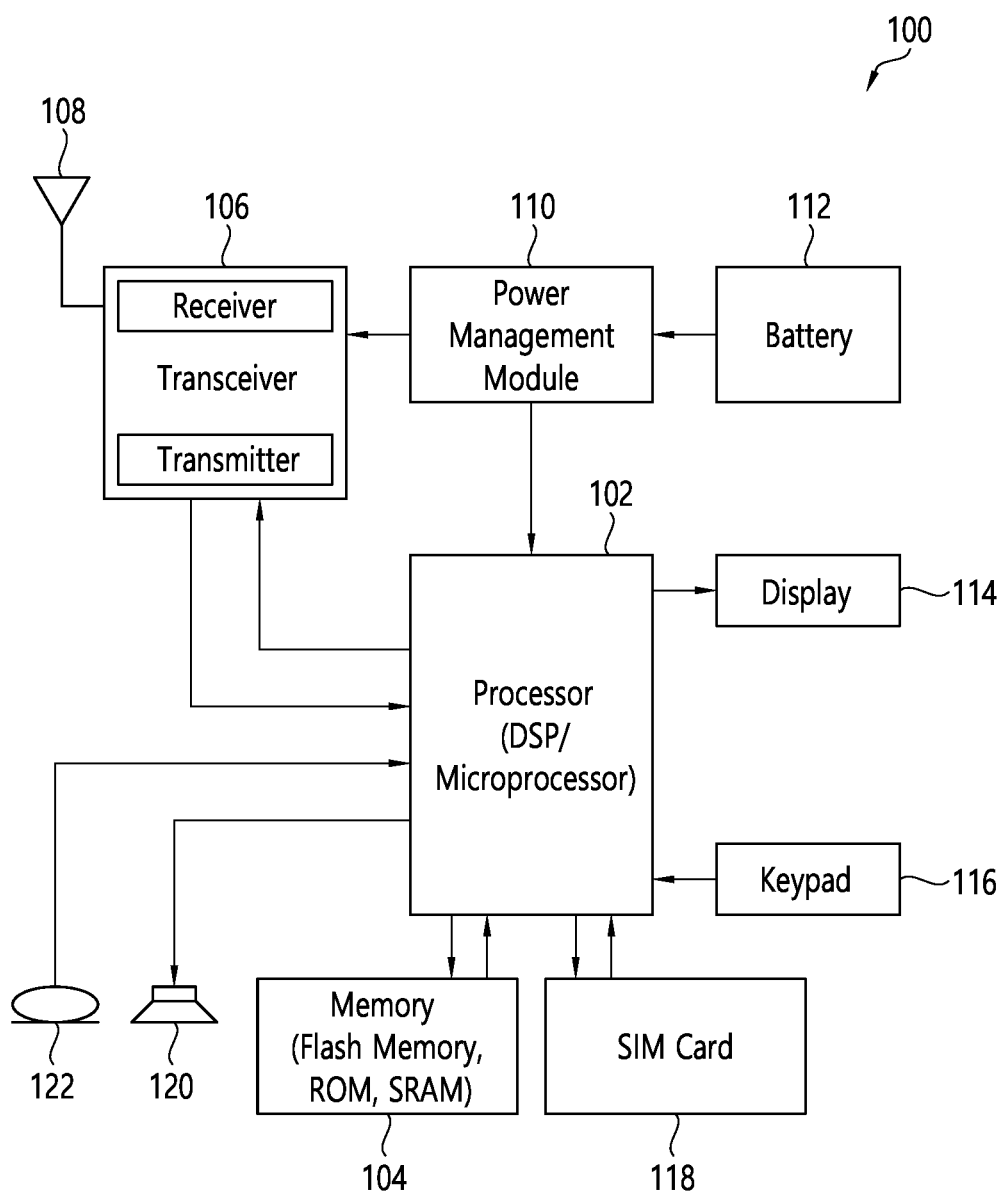
FIG. 10 shows an example of UE to which implementations of the present disclosure can be applied.

FIG. 10 shows an example of UE to which implementations of the present disclosure can be applied.

Referring to FIG. 10, a UE 100 may correspond to the first wireless device 100 of FIG. 7 and/or the first wireless device 100 of FIG. 9.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by Medi-aTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Cell search is the procedure by which a UE acquires time and frequency synchronization with a cell and detects the cell ID of that cell. NR cell search is based on the primary synchronization signal (PSS) and secondary synchronization signal (SSS), and PBCH demodulation reference signal (DM-RS), located on the synchronization raster.

The cell search procedure of the UE can be summarized in Table 5.

TABLE 5

| | Type of Signals | Operations |
|---|---|---|
| 1$^{st}$ step | PSS | SS/PBCH block (SSB) symbol timing acquisition<br>Cell ID detection within a cell ID group (3 hypothesis) |
| 2$^{nd}$ Step | SSS | Cell ID group detection (336 hypothesis) |
| 3$^{rd}$ Step | PBCH DM-RS | SSB index and Half frame index(Slot and frame boundary detection) |
| 4$^{th}$ Step | PBCH | Time information (80 ms, SFN, SSB index, HF)<br>RMSI CORESET/Search space configuration |
| 5$^{th}$ Step | PDCCH and PDSCH | Cell access information<br>RACH configuration |

Figure 11:
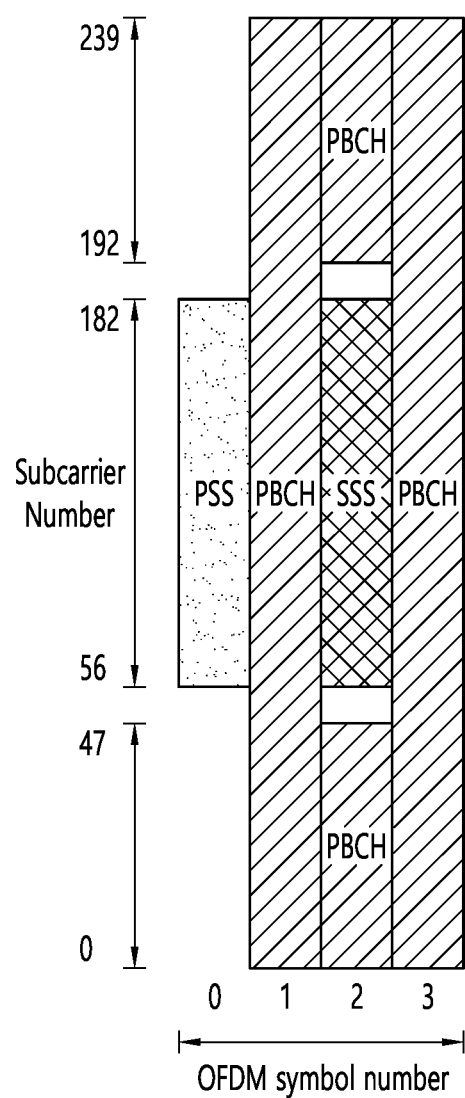
FIG. 11 shows an example of SSB to which implementations of the present disclosure can be applied.

FIG. 11 shows an example of SSB to which implementations of the present disclosure can be applied.

The SSB consists of PSS and SSS, each occupying 1 symbol and 127 subcarriers, and PBCH spanning across 3 OFDM symbols and 240 subcarriers, but on one symbol leaving an unused part in the middle for SSS. The possible time locations of SSBs within a half-frame are determined by subcarrier spacing and the periodicity of the half-frames where SSBs are transmitted is configured by the network. During a half-frame, different SSBs may be transmitted in different spatial directions (i.e. using different beams, spanning the coverage area of a cell).

Within the frequency span of a carrier, multiple SSBs can be transmitted. The physical cell IDs (PCIs) of SSBs transmitted in different frequency locations do not have to be unique, i.e., different SSBs in the frequency domain can have different PCIs. However, when an SSB is associated with a remaining minimum system information (RMSI), the SSB corresponds to an individual cell, which has a unique NR cell global identity (NCGI). Such an SSB is referred to as a cell-defining SSB (CD-SSB). A PCell is always associated to a CD-SSB located on the synchronization raster.

Polar coding is used for PBCH.

The UE may assume a band-specific subcarrier spacing for the SSB unless a network has configured the UE to assume a different sub-carrier spacing.

PBCH symbols carry its own frequency-multiplexed DM-RS.

Quadrature phase shift keying (QPSK) modulation is used for PBCH.

System information (SI) consists of a master information block (MIB) and a number of system information blocks (SIBs), which are divided into minimum SI and other SI.

(1) Minimum SI comprises basic information required for initial access and information for acquiring any other SI. Minimum SI consists of:

MIB contains cell barred status information and essential physical layer information of the cell required to receive further system information (e.g., SIB1), e.g. CORESET #0 configuration. MIB is always periodically broadcast on BCH with a periodicity of 80 ms and repetitions made within 80 ms. The first transmission of the MIB is scheduled in subframes as defined above for SS/PBCH block and repetitions are scheduled according to the period of SSB.

SIB1 defines the availability and the scheduling of other system information blocks (e.g., mapping of SIBs to SI message, periodicity, SI-window size) with an indication whether one or more SIBs are only provided on-demand and, in that case, the configuration needed by the UE to perform the SI request and contains information required for initial access. SIB1 is also referred to as RMSI and is periodically broadcast on DL-SCH or sent in a dedicated manner on DL-SCH to UEs in RRC_CONNECTED, with a periodicity of 160 ms and variable transmission repetition periodicity within 160 ms. The default transmission repetition periodicity of SIB1 is 20 ms but the actual transmission repetition periodicity is up to network implementation. For SSB and CORESET multiplexing pattern 1, SIB1 repetition transmission period is 20 ms. For SSB and CORESET multiplexing pattern 2/3, SIB1 transmission repetition period is the same as the SSB period. SIB1 is cell-specific SIB.

(2) Other SI encompasses all SIBs not broadcast in the minimum SI. Those SIBs can either be periodically broadcast on DL-SCH, broadcast on-demand on DL-SCH (i.e., upon request from UEs in RRC_IDLE or RRC_INACTIVE), or sent in a dedicated manner on DL-SCH to UEs in RRC_CONNECTED. SIBs in other SI are carried in SystemInformation (SI) messages. Only SIBs having the same periodicity can be mapped to the same SI message. Each SI message is transmitted within periodically occurring time domain windows (referred to as SI-windows with same length for all SI messages). Each SI message is associated with an SI-window and the SI-windows of different SI messages do not overlap. That is, within one SI-window only the corresponding SI message is transmitted. An SI message may be transmitted a number of times within the SI-window. Any SIB except SIB1 can be configured to be cell specific or area specific, using an indication in SIB1. The cell specific SIB is applicable only within a cell that provides the SIB while the area specific SIB is applicable within an area referred to as SI area, which consists of one or several cells and is identified by systemInformation-AreaID. Other SI consists of:

SIB2 contains cell re-selection information, mainly related to the serving cell;

SIB3 contains information about the serving frequency and intra-frequency neighbouring cells relevant for cell re-selection (including cell re-selection parameters common for a frequency as well as cell specific re-selection parameters);

SIB4 contains information about other NR frequencies and inter-frequency neighbouring cells relevant for cell re-selection (including cell re-selection parameters common for a frequency as well as cell specific re-selection parameters);

SIB5 contains information about E-UTRA frequencies and E-UTRA neighbouring cells relevant for cell re-selection (including cell re-selection parameters common for a frequency as well as cell specific re-selection parameters);

SIB6 contains an earthquake and tsunami warning system (ETWS) primary notification;

SIB7 contains an ETWS secondary notification;

SIB8 contains a commercial mobile alert system (CMAS) warning notification;

SIB9 contains information related to global positioning system (GPS) time and coordinated universal Time (UTC).

For a UE in RRC_CONNECTED, the network can provide system information through dedicated signaling using the RRCReconfiguration message, e.g. if the UE has an active BWP with no common search space configured to monitor system information or paging.

For PSCell and SCells, the network provides the required SI by dedicated signaling, i.e., within an RRCReconfiguration message. Nevertheless, the UE shall acquire MIB of the PSCell to get system frame number (SFN) timing of the SCG (which may be different from MCG). Upon change of relevant SI for SCell, the network releases and adds the concerned SCell. For PSCell, the required SI can only be changed with Reconfiguration with Sync.

The physical layer imposes a limit to the maximum size a SIB can take. The maximum SIB1 or S1 message size is 2976 bits.

Figure 12:
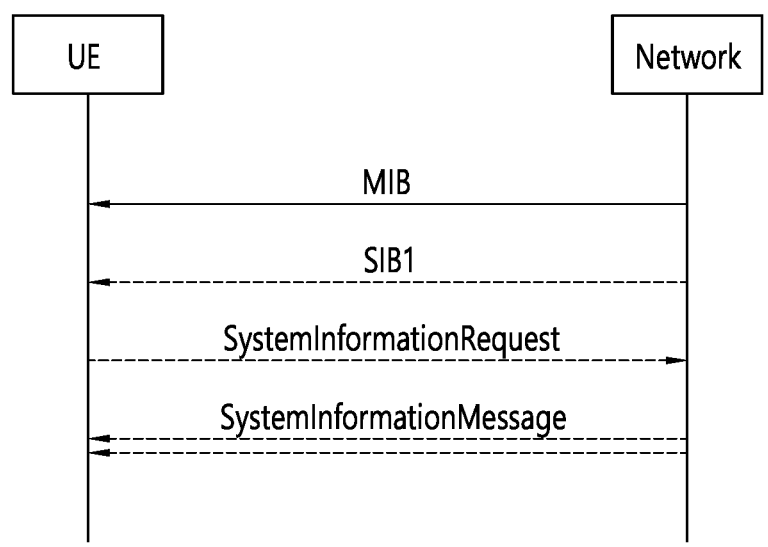
FIG. 12 shows an example of SI acquisition procedure to which implementations of the present disclosure can be applied.

FIG. 12 shows an example of SI acquisition procedure to which implementations of the present disclosure can be applied.

The UE applies the SI acquisition procedure to acquire the AS and NAS information.

The procedure applies to UEs in RRC_IDLE, in RRC_INACTIVE and in RRC_CONNECTED.

The UE in RRC_IDLE and RRC_INACTIVE shall ensure having a valid version of (at least) the MIB, SIB1 through SIB4 and SIB5 (if the UE supports E-UTRA).

For a cell/frequency that is considered for camping by the UE, the UE is not required to acquire the contents of the minimum SI of that cell/frequency from another cell/frequency layer. This does not preclude the case that the UE applies stored SI from previously visited cell(s).

If the UE cannot determine the full contents of the minimum SI of a cell by receiving from that cell, the UE shall consider that cell as barred.

In case of bandwidth adaptation (BA), the UE only acquires SI on the active BWP.

For UEs in RRC_IDLE and RRC_INACTIVE, a request for other SI triggers a random access procedure where MSG3 includes the SI request message unless the requested SI is associated to a subset of the PRACH resources, in which case MSG1 is used for indication of the requested other SI. When MSG1 is used, the minimum granularity of the request is one SI message (i.e., a set of SIBs), one RACH preamble and/or PRACH resource can be used to request multiple SI messages and the gNB acknowledges the request in MSG2. When MSG 3 is used, the gNB acknowledges the request in MSG4.

The other SI may be broadcast at a configurable periodicity and for a certain duration. The other SI may also be broadcast when it is requested by UE in RRC_IDLE/RRC_INACTIVE.

For a UE to be allowed to camp on a cell it must have acquired the contents of the minimum SI from that cell. There may be cells in the system that do not broadcast the minimum SI and where the UE therefore cannot camp.

Change of system information (other than for ETWS/CMAS4) only occurs at specific radio frames, i.e., the concept of a modification period is used. System information may be transmitted a number of times with the same content within a modification period, as defined by its scheduling. The modification period is configured by system information.

When the network changes (some of the) system information, it first notifies the UEs about this change, i.e., this may be done throughout a modification period. In the next modification period, the network transmits the updated system information. Upon receiving a change notification, the UE acquires the new system information from the start of the next modification period. The UE applies the previously acquired system information until the UE acquires the new system information.

The random access procedure of the UE can be summarized in Table 6.

TABLE 6

| | Type of Signals | Operations/Information Acquired |
|---|---|---|
| 1st step | PRACH preamble in UL | Initial beam acquisition<br>Random election of RA-preamble ID |
| 2nd Step | Random Access Response on DL-SCH | Timing alignment information<br>RA-preamble ID<br>Initial UL grant, Temporary C-RNTI |
| 3rd Step | UL transmission on UL-SCH | RRC connection request UE identifier |
| 4th Step | Contention Resolution on DL | Temporary C-RNTI on PDCCH for initial access<br>C-RNTI on PDCCH for UE in RRC_CONNECTED |

The random access procedure is triggered by a number of events:
Initial access from RRC_IDLE;
RRC connection re-establishment procedure;
DL or UL data arrival during RRC_CONNECTED when UL synchronization status is "non-synchronized";
UL data arrival during RRC_CONNECTED when there are no PUCCH resources for scheduling request (SR) available;
SR failure;
Request by RRC upon synchronous reconfiguration (e.g., handover);
Transition from RRC_INACTIVE;
To establish time alignment for a secondary timing advance group (TAG);
Request for other SI;
Beam failure recovery.

Figure 13:
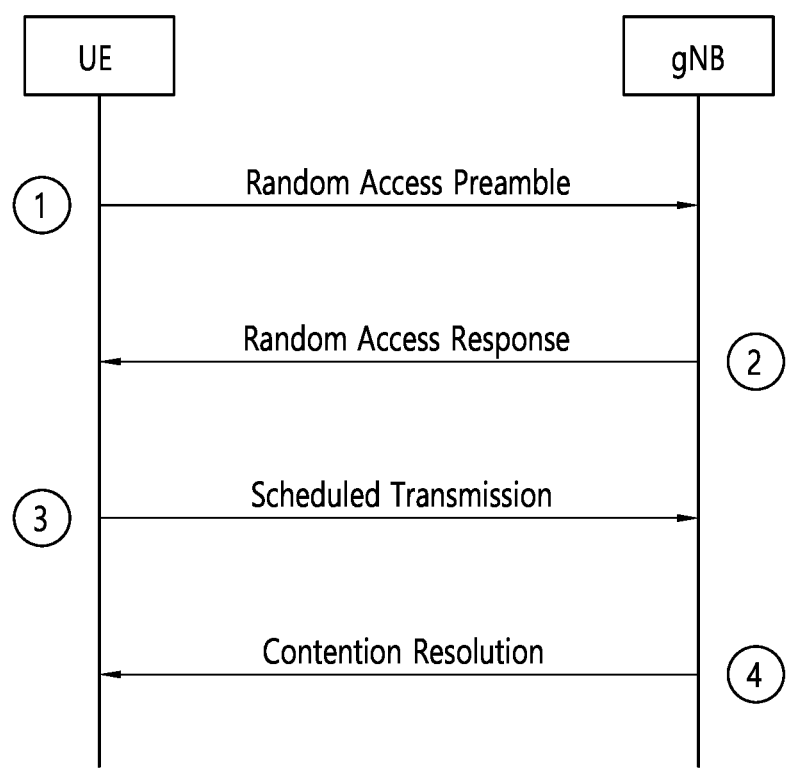
FIG. 13 shows an example of contention-based random access (CBRA) to which implementations of the present disclosure can be applied.
Figure 14:
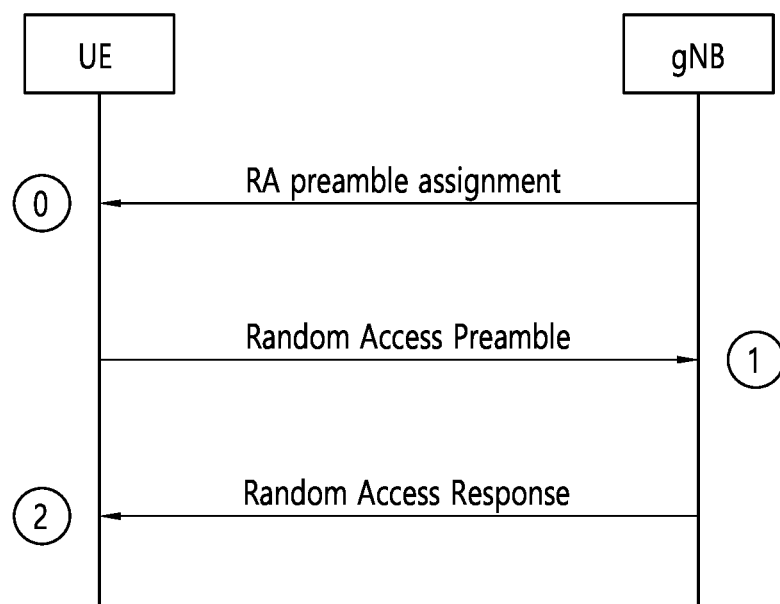
FIG. 14 shows an example of contention-free random access (CFRA) to which implementations of the present disclosure can be applied.

FIG. 13 shows an example of contention-based random access (CBRA) to which implementations of the present disclosure can be applied. FIG. 14 shows an example of contention-free random access (CFRA) to which implementations of the present disclosure can be applied.

For random access in a cell configured with supplementary UL (SUL), the network can explicitly signal which carrier to use (UL or SUL). Otherwise, the UE selects the SUL carrier if and only if the measured quality of the DL is lower than a broadcast threshold. Once started, all uplink transmissions of the random access procedure remain on the selected carrier.

When CA is configured, the first three steps of CBRA always occur on the PCell while contention resolution (step 4) can be cross-scheduled by the PCell. The three steps of a CFRA started on the PCell remain on the PCell. CFRA on SCell can only be initiated by the gNB to establish timing advance for a secondary TAG: the procedure is initiated by the gNB with a PDCCH order (step 0) that is sent on a scheduling cell of an activated SCell of the secondary TAG, preamble transmission (step 1) takes place on the indicated SCell, and random access response (step 2) takes place on PCell.

Random access preamble sequences, of two different lengths are supported. Long sequence length 839 is applied with subcarrier spacings of 1.25 and 5 kHz and short sequence length 139 is applied with subcarrier spacings of 15, 30, 60 and 120 kHz. Long sequences support unrestricted sets and restricted sets of Type A and Type B, while short sequences support unrestricted sets only.

Multiple PRACH preamble formats are defined with one or more PRACH OFDM symbols, and different cyclic prefix and guard time. The PRACH preamble configuration to use is provided to the UE in the system information.

The UE calculates the PRACH transmit power for the retransmission of the preamble based on the most recent estimate pathloss and power ramping counter.

Figure 15:
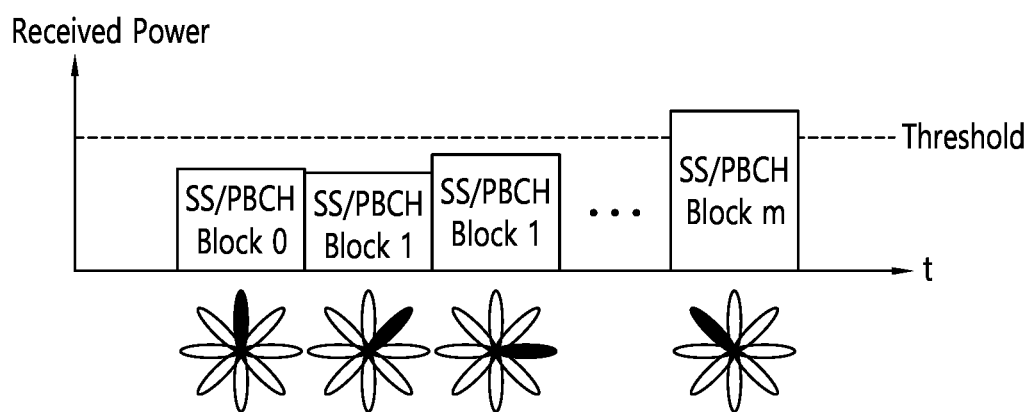
FIG. 15 shows a concept of threshold of the SSB for RACH resource association to which implementations of the present disclosure can be applied.

FIG. 15 shows a concept of threshold of the SSB for RACH resource association to which implementations of the present disclosure can be applied.

The system information provides information for the UE to determine the association between the SSB and the RACH resources. The reference signal received power (RSRP) threshold for SSB selection for RACH resource association is configurable by network.

Figure 16:
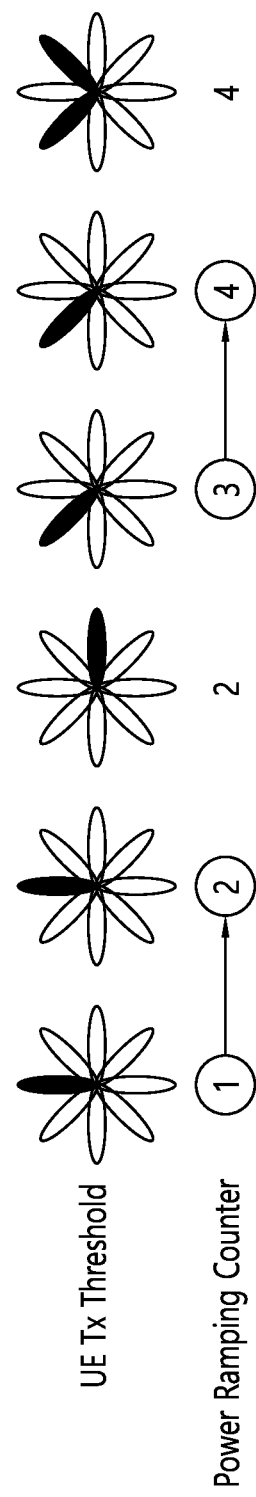
FIG. 16 shows an example of operation of power ramping counter to which implementations of the present disclosure can be applied.

FIG. 16 shows an example of operation of power ramping counter to which implementations of the present disclosure can be applied.

If the UE conducts beam switching, the counter of power ramping remains unchanged. For example, the UE may perform power ramping for retransmission of the random access preamble based on a power ramping counter. However, the power ramping counter remains unchanged if a UE conducts beam switching in the PRACH retransmissions. Referring to FIG. 16, the UE may increase the power ramping counter by 1, when the UE retransmit the random access preamble for the same beam. However, when the beam had been changed, the power ramping counter remains unchanged.

Sidelink (SL) grant reception and sidelink control information (SCI) transmission is described. Section 5.14.1.1 of 3GPP TS 36.321 V15.7.0 can be referred.

In order to transmit on the sidelink shared channel (SL-SCH), the MAC entity must have at least one sidelink grant.

Sidelink grants are selected as follows for sidelink communication:

1> if the MAC entity is configured to receive a single sidelink grant dynamically on the PDCCH and more data is available in sidelink traffic channel (STCH) than can be transmitted in the current sidelink control (SC) period, the MAC entity shall:
2> using the received sidelink grant determine the set of subframes in which transmission of SCI and transmission of first transport block occur;
2> consider the received sidelink grant to be a configured sidelink grant occurring in those subframes starting at the beginning of the first available SC period which starts at least 4 subframes after the subframe in which the sidelink grant was received, overwriting a previously configured sidelink grant occurring in the same SC period, if available;
2> clear the configured sidelink grant at the end of the corresponding SC period;
1> else, if the MAC entity is configured by upper layers to receive multiple sidelink grants dynamically on the PDCCH and more data is available in STCH than can be transmitted in the current SC period, the MAC entity shall for each received sidelink grant:
2> using the received sidelink grant determine the set of subframes in which transmission of SCI and transmission of first transport block occur;
2> consider the received sidelink grant to be a configured sidelink grant occurring in those subframes starting at the beginning of the first available SC period which starts at least 4 subframes after the subframe in which the sidelink grant was received, overwriting a previously configured sidelink grant received in the same subframe number but in a different radio frame as this configured sidelink grant occurring in the same SC period, if available;
2> clear the configured sidelink grant at the end of the corresponding SC period;
1> else, if the MAC entity is configured by upper layers to transmit using one or multiple pool(s) of resources and more data is available in STCH than can be transmitted in the current SC period, the MAC entity shall for each sidelink grant to be selected:
2> if configured by upper layers to use a single pool of resources:
3> select that pool of resources for use;
2> else, if configured by upper layers to use multiple pools of resources:
3> select a pool of resources for use from the pools of resources configured by upper layers whose associated priority list includes the priority of the highest priority of the sidelink logical channel in the MAC PDU to be transmitted;
2> randomly select the time and frequency resources for SL-SCH and SCI of a sidelink grant from the selected resource pool. The random function shall be such that each of the allowed selections can be chosen with equal probability;
2> use the selected sidelink grant to determine the set of subframes in which transmission of SCI and transmission of first transport block occur;
2> consider the selected sidelink grant to be a configured sidelink grant occurring in those subframes starting at the beginning of the first available SC period which starts at least 4 subframes after the subframe in which the sidelink grant was selected;
2> clear the configured sidelink grant at the end of the corresponding SC period;

Retransmissions on SL-SCH cannot occur after the configured sidelink grant has been cleared.

Sidelink grants are selected as follows for vehicle-to-everything (V2X) sidelink communication:

1> if the MAC entity is configured to receive a sidelink grant dynamically on the PDCCH and data is available in STCH, the MAC entity shall for each carrier configured in sl-V2X-ConfigDedicated for which a sidelink grant has been dynamically received on the PDCCH for this TTI:
2> use the received sidelink grant to determine the number of HARQ retransmissions and the set of subframes in which transmission of SCI and SL-SCH occur;
2> consider the received sidelink grant to be a configured sidelink grant for the carrier;
1> if the MAC entity is configured by upper layers to receive a sidelink grant on the PDCCH addressed to SL semi-persistent scheduling (SPS) V2X radio network temporary identity (V-RNTI), the MAC entity shall for each SL SPS configuration and for each carrier configured in sl-V2X-ConfigDedicated for which a sidelink grant has been received on the PDCCH addressed to SL semi-persistent scheduling V-RNTI for this TTI:
2> if PDCCH contents indicate SPS activation:
3> use the received sidelink grant to determine the number of HARQ retransmissions and the set of subframes in which transmission of SCI and SL-SCH occur;
3> consider the received sidelink grant to be a configured sidelink grant for the carrier.
2> if PDCCH contents indicate SPS release:
3> clear the corresponding configured sidelink grant for the carrier.
1> if the MAC entity is configured by upper layers to transmit using pool(s) of resources in one or multiple carriers based on sensing, or partial sensing, or random selection only if upper layers indicates that transmissions of multiple MAC PDUs are allowed, and the MAC entity selects to create a configured sidelink grant corresponding to transmissions of multiple MAC PDUs, and data is available in STCH associated with one or multiple carriers, the MAC entity shall for each sidelink process configured for multiple transmissions:
2> if there is no configured sidelink grant associated with the sidelink process on any carrier allowed for the STCH as indicated by upper layers:
3> trigger the TX carrier (re-)selection procedure as specified below;
2> else if there is a configured sidelink grant associated with the sidelink process:
3> if SL_RESOURCE_RESELECTION_COUNTER=0 and when SL_RESOURCE_RESELECTION_COUNTER was equal to 1 the MAC entity randomly selected, with equal probability, a value in the interval [0, 1] which is above the probability configured by upper layers in probResourceKeep; or 3> if neither transmission nor retransmission has been performed by the MAC entity on any resource indicated in the configured sidelink grant during the last second; or 3> if sl-ReselectAfter is configured and the number of consecutive unused transmission opportunities on resources indicated in the configured sidelink grant is equal to sl-ReselectAfter; or 3> if none of the configured sidelink grant(s) on the carrier(s) allowed for the STCH have radio resources available in this TTI to accommodate a RLC SDU by using the maximum allowed modulation and coding scheme (MCS) configured by upper layers in maxMCS-PSSCH and the MAC entity selects not to segment the RLC SDU; or 3> if none of the configured sidelink grant(s) on the carrier(s) allowed for the STCH have radio resources available in this TTI, to fulfil the latency requirement of the data in a sidelink logical channel according to the associated ProSe-per-packet priority (PPPP), and the MAC entity selects not to perform transmission(s) corresponding to a single MAC PDU; or 3> if the pool of resources where the sidelink grant is configured for the sidelink process, is reconfigured by upper layers:

4> trigger the TX carrier (re-)selection procedure as specified below;

4> clear the configured sidelink grant associated to the sidelink process;

4> flush the HARQ buffer associated to the sidelink process;

3> else if SL_RESOURCE_RESELECTION_COUNTER=0 and when SL_RESOURCE_RESELECTION_COUNTER was equal to 1 the MAC entity randomly selected, with equal probability, a value in the interval [0, 1] which is less than or equal to the probability configured by upper layers in probResourceKeep:

4> clear the configured sidelink grant, if available;

4> randomly select, with equal probability, an integer value in the interval [5, 15] for the resource reservation interval higher than or equal to 100 ms, in the interval [10, 30] for the resource reservation interval equal to 50 ms or in the interval [25, 75] for the resource reservation interval equal to 20 ms, and set SL_RESOURCE_RESELECTION_COUNTER to the selected value;

4> use the previously selected sidelink grant for the number of transmissions of the MAC PDUs with the resource reservation interval to determine the set of subframes in which transmissions of SCI and SL-SCH occur;

4> consider the selected sidelink grant to be a configured sidelink grant;

2> if the TX carrier (re-)selection procedure was triggered in above and one or more carriers have been (re-)selected in the Tx carrier (re-)selection:

3> determine the order of the (re-)selected carriers, according to the decreasing order based on the highest priority of logical channels which are allowed on each (re-)selected carrier, and perform the following for each Sidelink process on each (re-)selected carrier according to the order:

4> select one of the allowed values configured by upper layers in restrictResourceReservationPeriod and set the resource reservation interval by multiplying 100 with the selected value;

4> randomly select, with equal probability, an integer value in the interval [5, 15] for the resource reservation interval higher than or equal to 100 ms, in the interval [10, 30] for the resource reservation interval equal to 50 ms or in the interval [25, 75] for the resource reservation interval equal to 20 ms, and set SL_RESOURCE_RESELECTION_COUNTER to the selected value;

4> select the number of HARQ retransmissions from the allowed numbers that are configured by upper layers in allowedRetxNumberPSSCH included in pssch-TxConfigList and, if configured by upper layers, overlapped in allowedRetxNumberPSSCH indicated in cbr-pssch-TxConfigList for the highest priority of the sidelink logical channel(s) allowed on the selected carrier and the channel busy ratio (CBR) measured by lower layers if CBR measurement results are available or the corresponding defaultTxConfigIndex configured by upper layers if CBR measurement results are not available;

4> select an amount of frequency resources within the range that is configured by upper layers between minSubchannel-NumberPSSCH and maxSubchannel-NumberPSSCH included in pssch-TxConfigList and, if configured by upper layers, overlapped between minSubchannel-NumberPSSCH and maxSubchannel-NumberPSSCH indicated in cbr-pssch-TxConfigList for the highest priority of the sidelink logical channel(s) allowed on the selected carrier and the CBR measured by lower layers if CBR measurement results are available or the corresponding defaultTxConfigIndex configured by upper layers if CBR measurement results are not available;

4> randomly select the time and frequency resources for one transmission opportunity from the resources indicated by the physical layer, according to the amount of selected frequency resources. The selected time and frequency resources shall fulfil the physical layer requirements, and the random function shall be such that each of the allowed selections can be chosen with equal probability;

4> use the randomly selected resource to select a set of periodic resources spaced by the resource reservation interval for transmission opportunities of SCI and SL-SCH corresponding to the number of transmission opportunities of MAC PDUs;

4> if the number of HARQ retransmissions is equal to 1:

5> if there are available resources left in the resources indicated by the physical layer that meet the conditions for more transmission opportunities:

6> randomly select the time and frequency resources for one transmission opportunity from the available resources, according to the amount of selected frequency resources. The selected time and frequency resources shall fulfil the physical layer requirements, and the random function shall be such that each of the allowed selections can be chosen with equal probability;

6> use the randomly selected resource to select a set of periodic resources spaced by the resource reservation interval for the other transmission opportunities of SCI and SL-SCH corresponding to the number of retransmission opportunities of the MAC PDUs;

6> consider the first set of transmission opportunities as the new transmission opportunities and the other set of transmission opportunities as the retransmission opportunities;
6> consider the set of new transmission opportunities and retransmission opportunities as the selected sidelink grant.
4> else:
5> consider the set as the selected sidelink grant;
4> use the selected sidelink grant to determine the set of subframes in which transmissions of SCI and SL-SCH occur;
4> consider the selected sidelink grant to be a configured sidelink grant;
1> else, if the MAC entity is configured by upper layers to transmit using pool(s) of resources in one or multiple carriers, the MAC entity selects to create a configured sidelink grant corresponding to transmission(s) of a single MAC PDU, and data is available in STCH associated with one or multiple carriers, the MAC entity shall for a sidelink process:
2> trigger the TX carrier (re-)selection procedure as specified below;
2> if one or more carriers have been (re-)selected in the Tx carrier (re-)selection:
3> determine the order of the (re-)selected carriers, according to the decreasing order based on the highest priority of logical channels which are allowed on each (re-)selected carrier, and perform the following for each Sidelink process on each (re-)selected carrier according to the order:
4> select the number of HARQ retransmissions from the allowed numbers that are configured by upper layers in allowedRetxNumberPSSCH included in pssch-TxConfigList and, if configured by upper layers, overlapped in allowedRetxNumberPSSCH indicated in cbr-pssch-TxConfigList for the highest priority of the sidelink logical channel(s) allowed on the selected carrier and the CBR measured by lower layers if CBR measurement results are available or the corresponding defaultTxConfigIndex configured by upper layers if CBR measurement results are not available;
4> select an amount of frequency resources within the range that is configured by upper layers between minSubchannel-NumberPSSCH and maxSubchannel-NumberPSSCH included in pssch-TxConfigList and, if configured by upper layers, overlapped between minSubchannel-NumberPSSCH and maxSubchannel-NumberPSSCH indicated in cbr-pssch-TxConfigList for the highest priority of the sidelink logical channel(s) allowed on the selected carrier and the CBR measured by lower layers if CBR measurement results are available or the corresponding defaultTxConfigIndex configured by upper layers if CBR measurement results are not available;
4> randomly select the time and frequency resources for one transmission opportunity of SCI and SL-SCH from the resources indicated by the physical layer, according to the amount of selected frequency resources. The selected time and frequency resources shall fulfil the physical layer requirement, and the random function shall be such that each of the allowed selections can be chosen with equal probability;
4> if the number of HARQ retransmissions is equal to 1:
5> if there are available resources left in the resources indicated by the physical layer that meet the conditions for one more transmission opportunity:
6> randomly select the time and frequency resources for the other transmission opportunity of SCI and SL-SCH corresponding to additional transmission of the MAC PDU from the available resources, according to the amount of selected frequency resources. The selected time and frequency resources shall fulfil the physical layer requirements, and the random function shall be such that each of the allowed selections can be chosen with equal probability;
6> consider a transmission opportunity which comes first in time as the new transmission opportunity and a transmission opportunity which comes later in time as the retransmission opportunity;
6> consider both of the transmission opportunities as the selected sidelink grant;
4> else:
5> consider the transmission opportunity as the selected sidelink grant;
4> use the selected sidelink grant to determine the subframes in which transmission(s) of SCI and SL-SCH occur];
4> consider the selected sidelink grant to be a configured sidelink grant.

For V2X sidelink communication, the UE should ensure the randomly selected time and frequency resources fulfill the latency requirement.

The MAC entity shall for each subframe:
1> for each configured sidelink grant occurring in this subframe:
2> if SL_RESOURCE_RESELECTION_COUNTER=1 for the sidelink process associated with the configured sidelink grant and the MAC entity randomly selected, with equal probability, a value in the interval [0, 1] which is above the probability configured by upper layers in probResourceKeep:
3> set the resource reservation interval for the configured sidelink grant equal to 0;
2> if the configured sidelink grant corresponds to transmission of SCI:
3> for V2X sidelink communication in UE autonomous resource selection:
4> consider the selected transmission format to be SL-V2X-TxProfile for the highest priority of the sidelink logical channel(s) in the MAC PDU;
4> select a MCS which is, if configured, within the range that is configured by upper layers between minMCS-PSSCH and maxMCS-PSSCH included in pssch-TxConfigList associated with the selected transmission format and, if configured by upper layers, overlapped between minMCS-PSSCH and maxMCS-PSSCH indicated in cbr-pssch-TxConfigList associated with the selected transmission format for the highest priority of the sidelink logical channel(s) in the MAC PDU and the CBR measured by lower layers if CBR measurement results are available or the corresponding defaultTxConfigIndex configured by upper layers if CBR measurement results are not available;
3> for V2X sidelink communication in scheduled resource allocation:
4> consider the selected transmission format to be SL-V2X-TxProfile for the highest priority of the sidelink logical channel(s) in the MAC PDU;
4> select a MCS which is associated with the selected transmission format unless it is configured by upper layer;
3> instruct the physical layer to transmit SCI corresponding to the configured sidelink grant;

3> for V2X sidelink communication, deliver the configured sidelink grant, the associated HARQ information and the value of the highest priority of the sidelink logical channel(s) in the MAC PDU to the sidelink HARQ entity for this subframe;

2> else if the configured sidelink grant corresponds to transmission of first transport block for sidelink communication:

3> deliver the configured sidelink grant and the associated HARQ information to the sidelink HARQ entity for this subframe.

For NR sidelink transmission, HARQ feedback can be supported. Therefore, it needs to be clearly defined how to handle retransmission resources for a data unit upon reception of the positive acknowledgement for the data unit. If not clearly defined, even after receiving the positive acknowledgement for the data unit, retransmission of the data unit can occur since retransmission resources for the data unit are remained. This leads to waste of resources.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 17:
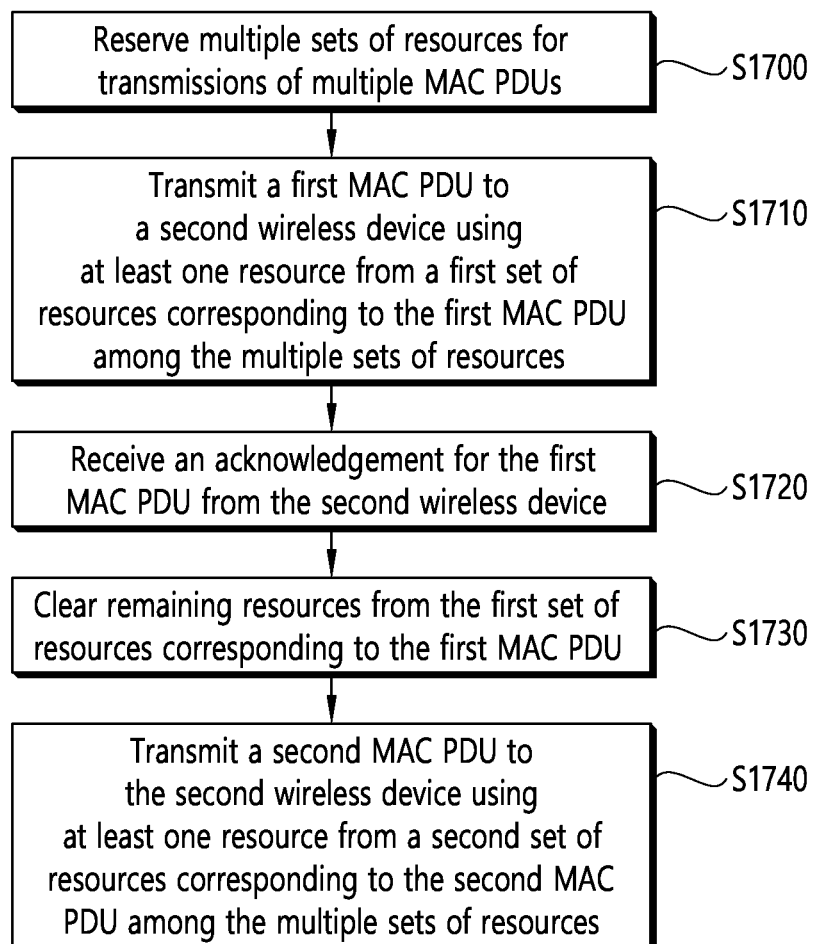
FIG. 17 shows an example of a method performed by a first wireless device (e.g., transmitting (TX) wireless device) to which implementations of the present disclosure can be applied.

FIG. 17 shows an example of a method performed by a first wireless device (e.g., transmitting (TX) wireless device) to which implementations of the present disclosure can be applied.

In step S1700, the first wireless device reserves multiple sets of resources for transmissions of multiple MAC PDUs.

In some implementations, the multiple sets of resources may be reserved on a carrier.

In some implementations, the multiple sets of resources are considered as a sidelink grant for a HARQ process.

In step S1710, the first wireless device transmits a first MAC PDU to a second wireless device using at least one resource from a first set of resources corresponding to the first MAC PDU among the multiple sets of resources.

In step S1720, the first wireless device receives a positive acknowledgement for the first MAC PDU from the second wireless device.

In step S1730, upon receiving a positive acknowledgement for the first MAC PDU from the second wireless device, the first wireless device clears remaining resources from the first set of resources corresponding to the first MAC PDU.

In some implementations, the remaining resources from the first set of resources may be to be used for retransmission of the first MAC PDU.

In some implementations, other sets of resources from the multiple sets of resources may be kept while the remaining resources are cleared from the first set of resources.

In step S1740, the first wireless device transmits a second MAC PDU to the second wireless device using at least one resource from a second set of resources corresponding to the second MAC PDU among the multiple sets of resources.

In some implementations, the second MAC PDU is created based on the at least one resource from the second set of resources.

In some implementations, the first wireless device is in communication with at least one of a mobile device, a network, and/or autonomous vehicles other than the first wireless device.

Furthermore, the method in perspective of the first wireless device described above in FIG. 17 may be performed by first wireless device 100 shown in FIG. 7, the wireless device 100 shown in FIG. 8, the first wireless device 100 shown in FIG. 9 and/or the UE 100 shown in FIG. 10.

More specifically, the first wireless device comprises at least one transceiver, at least processor, and at least one computer memory operably connectable to the at least one processor and storing instructions that, based on being executed by the at least one processor, perform operations below.

The operations comprise reserving multiple sets of resources for transmissions of multiple MAC PDUs.

In some implementations, the multiple sets of resources may be reserved on a carrier.

In some implementations, the multiple sets of resources are considered as a sidelink grant for a HARQ process.

The operations comprise transmitting a first MAC PDU to a second wireless device using at least one resource from a first set of resources corresponding to the first MAC PDU among the multiple sets of resources.

The operations comprise receiving a positive acknowledgement for the first MAC PDU from the second wireless device.

The operations comprise clearing remaining resources from the first set of resources corresponding to the first MAC PDU.

In some implementations, the remaining resources from the first set of resources may be to be used for retransmission of the first MAC PDU.

In some implementations, other sets of resources from the multiple sets of resources may be kept while the remaining resources are cleared from the first set of resources.

The operations comprise transmitting a second MAC PDU to the second wireless device using at least one resource from a second set of resources corresponding to the second MAC PDU among the multiple sets of resources.

In some implementations, the second MAC PDU is created based on the at least one resource from the second set of resources.

Furthermore, the method in perspective of the first wireless device described above in FIG. 17 may be performed by control of the processor 102 included in the first wireless device 100 shown in FIG. 7, by control of the communication unit 110 and/or the control unit 120 included in the wireless device 100 shown in FIG. 8, by control of the processor 102 included in the first wireless device 100 shown in FIG. 9 and/or by control of the processor 102 included in the UE 100 shown in FIG. 10.

More specifically, an apparatus for configured to operate in a wireless communication system (e.g., first wireless device) comprises at least processor, and at least one computer memory operably connectable to the at least one processor. The at least one processor is configured to perform operations comprising reserving multiple sets of resources for transmissions of MAC PDUs, generating a first MAC PDU using at least one resource from a first set of resources corresponding to the first MAC PDU among the multiple sets of resources, obtaining a positive acknowledgement for the first MAC PDU, clearing remaining resources from the first set of resources corresponding to the first MAC PDU, and generating a second MAC PDU using at least one resource from a second set of resources corresponding to the second MAC PDU among the multiple sets of resources.

Furthermore, the method in perspective of the first wireless device described above in FIG. 17 may be performed by a software code 105 stored in the memory 104 included in the first wireless device 100 shown in FIG. 9.

More specifically, at least one computer readable medium (CRM) stores instructions that, based on being executed by at least one processor, perform operations comprising reserving multiple sets of resources for transmissions of MAC PDUs, generating a first MAC PDU using at least one resource from a first set of resources corresponding to the first MAC PDU among the multiple sets of resources, obtaining a positive acknowledgement for the first MAC PDU, clearing remaining resources from the first set of resources corresponding to the first MAC PDU, and generating a second MAC PDU using at least one resource from a second set of resources corresponding to the second MAC PDU among the multiple sets of resources.

According to implementations of the present disclosure shown in FIG. 17, an example of operations of the MAC entity may be as follows.

If the MAC entity has been configured with sidelink resource allocation mode 2 to transmit using pool(s) of resources in a carrier based on sensing or random selection, the MAC entity shall for each Sidelink process:

1> if the MAC entity has selected to create a selected sidelink grant corresponding to transmissions of multiple MAC PDUs, and SL data is available in a logical channel;

1> if a selected sidelink grant is available for retransmission(s) of a MAC PDU which has been positively acknowledged:

2> clear the physical sidelink control channel (PSCCH) duration(s) and physical sidelink shared channel (PSSCH) duration(s) corresponding to retransmission(s) of the MAC PDU from the selected sidelink grant.

Figure 18:
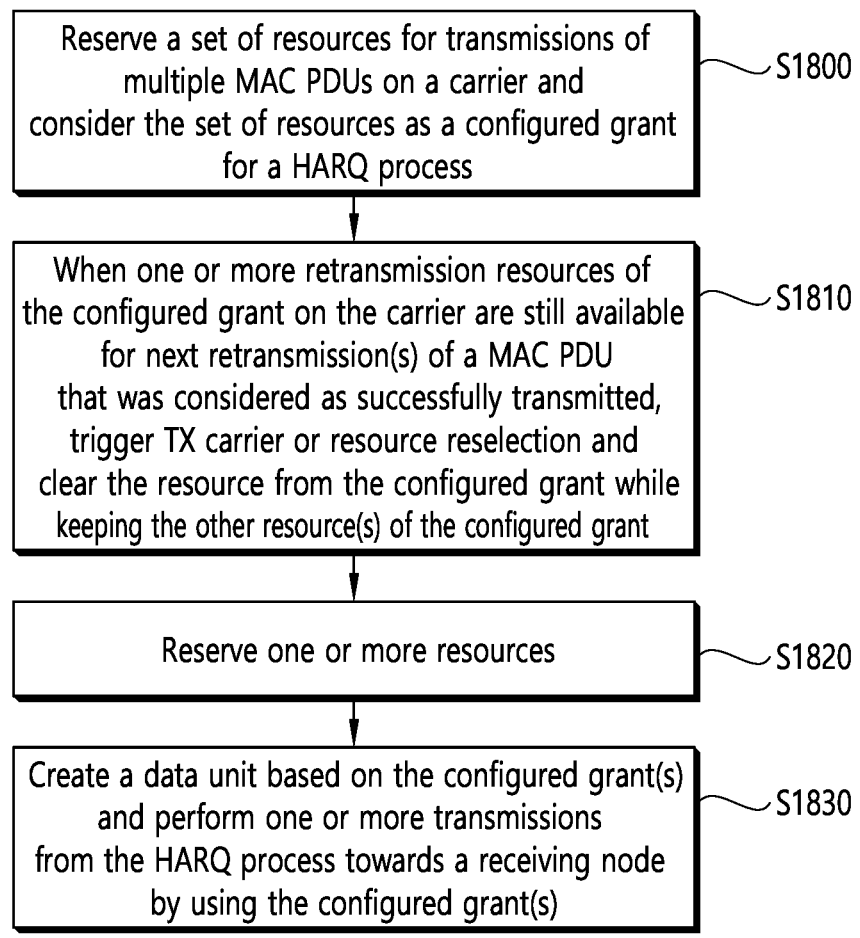
FIG. 18 shows an example of a method for performing data transmission by a UE to which implementations of the present disclosure can be applied.

FIG. 18 shows an example of a method for performing data transmission by a UE to which implementations of the present disclosure can be applied.

In step S1800, the UE reserves a set of resources on a carrier and considers the set of resources as a configured grant for a HARQ process.

In some implementations, the set of resources may be reserved for transmissions of multiple MAC PDUs.

In some implementations, the set of resources may be a set of NR resources.

In some implementations, the resource may be either sidelink resource or uplink resource.

In some implementations, the configured grant may be one of a configured sidelink grant, a configured grant Type 1 and a configured grant Type 2.

In some implementations, the UE may clear the resource (i.e., only part) of the configured grant associated to the HARQ process (e.g., sidelink process) for a carrier, if available.

In step S1810, when one or more retransmission resources of a configured grant on the carrier are still available for next retransmission(s) of the MAC PDU that was considered as successfully transmitted (e.g., due to reception of a positive acknowledgement to a transmission of a MAC PDU), the UE triggers TX carrier or resource reselection and clears the resource from the configured grant while keeping the other resource(s) of the configured grant.

More generally, upon detecting a condition for TX carrier or resource reselection being met for the resource of the configured grant, the UE may trigger TX carrier or resource reselection for transmission(s) of a single MAC PDU and clear the resource from the configured grant while keeping the other resource(s) of the configured grant. The condition mentioned in step S1810, i.e., one or more retransmission resources of a configured grant on the carrier are still available for next retransmission(s) of the MAC PDU that was considered as successfully transmitted, may be considered as one condition for TX carrier or resource reselection.

In some implementations, even though not shown in FIG. 18, other conditions for TX carrier or resource reselection may include at least one of the followings.

if a resource of the configured grant cannot accommodate a RLC SDU by using the maximum allowed MCS configured by upper layers in maxMCS-PSSCH and the MAC entity selects not to segment the RLC SDU; or if transmission(s) with a resource of the configured grant cannot fulfil the latency requirement of the data in a logical channel according to the associated priority, and the MAC entity selects not to perform transmission(s) corresponding to a single MAC PDU; or if sidelink transmission (for either LTE V2X communication or NR communication) is scheduled by the other UE with a higher priority than the priority of the logical channel and expected to overlap with a resource of the configured grant, and a measured result on sidelink reference signal received power (SL-RSRP) associated with the sidelink transmission is higher than threshold; or if sidelink transmission (for either LTE V2X communication or NR communication) is scheduled by the other UE with a higher priority than the priority of the logical channel and expected to overlap with a resource of the configured grant, and the UE cannot simultaneously receive the sidelink transmission scheduled by the other UE and perform a transmission on the resource at the same time;

if LTE or NR uplink transmission is scheduled for a MAC PDU of the highest logical channel priority which has a higher priority than either a threshold or the priority of the logical channel and expected to overlap with a resource of the configured grant, and the UE cannot simultaneously perform the uplink transmission and a transmission on the resource at the same time; or if sidelink transmission (for either LTE V2X communication or NR communication) is scheduled by the NG-RAN with a higher priority than the priority of the logical channel and expected to overlap with a resource of the configured grant, and the UE cannot simultaneously perform the sidelink transmission scheduled by the NG-RAN and perform a transmission on the resource at the same time;

In step S1820, upon triggering the TX carrier or resource reselection for transmission(s), the UE reserves one or more resources for transmission(s).

In some implementations, the one or more resources for transmission(s) may be reserved for transmission(s) of a single MAC PDU.

In some implementations, the one of the resources may be used for new transmission of a single MAC PDU while the other resource(s) may be used for retransmission(s) of the MAC PDU.

In some implementations, the one of the resources used for new transmission may be added to the configured grant.

In step S1830, the UE creates a data unit based on the configured grant(s) and performs one or more transmissions from a HARQ process towards a receiving node by using the configured grant(s).

In some implementations, the receiving node may be either another UE or a base station such as gNB or eNB. If the receiving node is another UE, the transmission may be performed in sidelink. If the receiving node is the base station, the transmission may be performed in uplink.

In some implementations, the data unit may be a MAC PDU.

Figure 19:
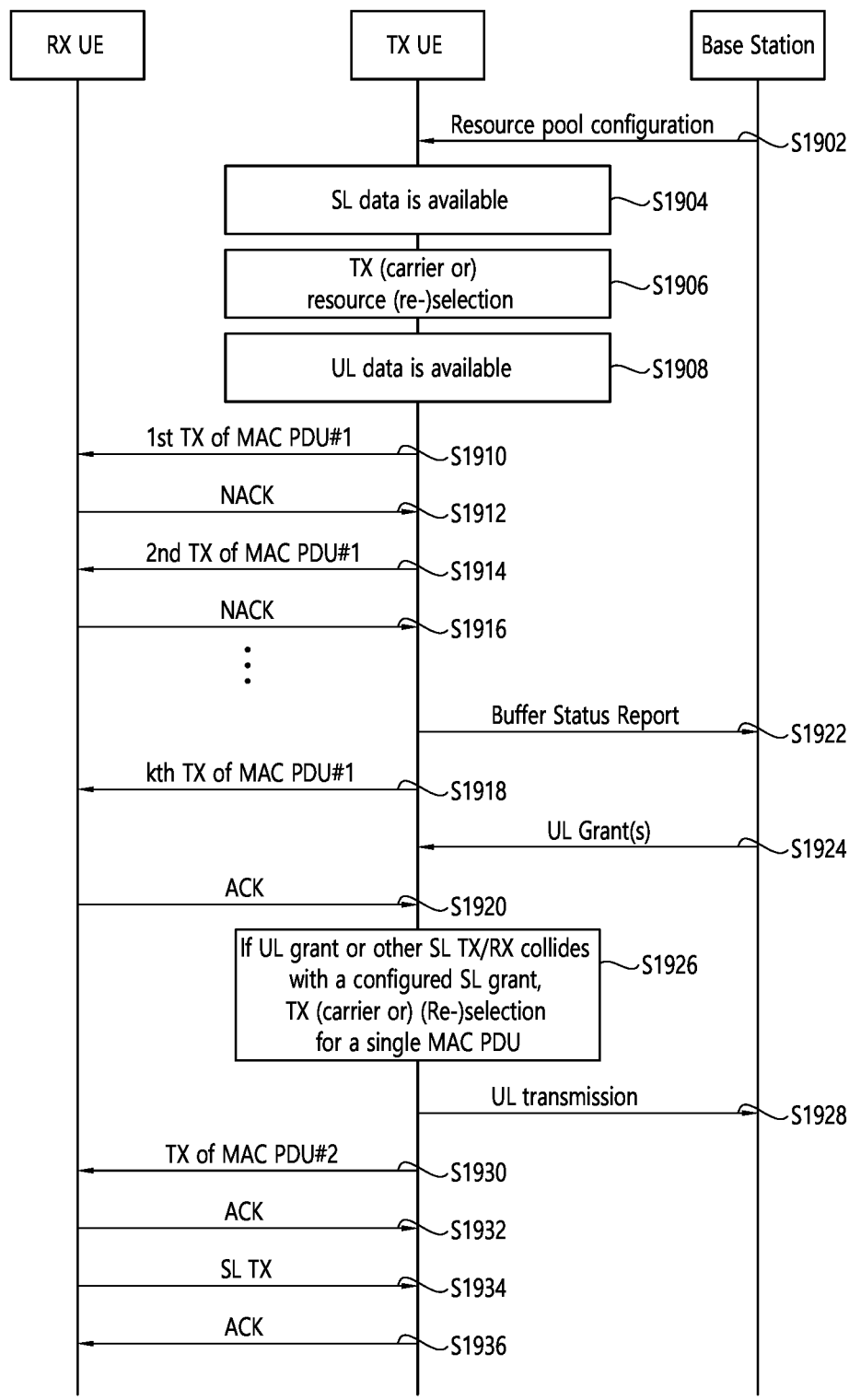
FIG. 19 shows an example of TX carrier or resource reselection for sidelink data transmission from a UE to which implementations of the present disclosure can be applied.

FIG. 19 shows an example of TX carrier or resource reselection for sidelink data transmission from a UE to which implementations of the present disclosure can be applied.

In step S1902, the TX UE may receive a resource pool configuration from a base station.

In step S1904, SL data may be available.

In step S1906, the TX UE performs TX carrier or resource (re)-selection. In other words, the TX UE may reserve a set of resources on a carrier and considers the set of resources as a configured grant for a HARQ process.

The set of resources may be reserved for transmissions of multiple MAC PDUs.

The set of resources may be a set of NR resources.

The set of resources may be either sidelink resource or uplink resource.

The configured grant may be one of a configured sidelink grant, a configured grant Type 1 and a configured grant Type 2.

The TX UE may clear the resource (i.e., only part) of the configured sidelink grant associated to the HARQ process (e.g., sidelink process) for a carrier, if available.

In step S1908, UL data may be available.

In step S1910, the TX UE performs a first transmission of MAC PDU #1 to the RX UE. In step S1919, the RX UE transmits non-acknowledgement (NACK) for the first transmission of MAC PDU #1 to the TX UE.

In step S1914, the TX UE performs a second transmission of MAC PDU #1 to the RX UE. In step S1916, the RX UE transmits NACK for the second transmission of MAC PDU #1 to the TX UE.

In step S1918, the TX UE performs a k-th transmission of MAC PDU #1 to the RX UE. In step S1920, the RX UE transmits (positive) ACK for the k-th transmission of MAC PDU #1 to the TX UE.

Meanwhile, in step S1922, the TX UE transmits a buffer status report (BSR) for the UL data to the base station. In step S1924, the TX UE receives UL grant(s) for transmission of the UL data from the base station.

In step S1926, when the TX UE detects that one of the following conditions is met for a resource of the configured sidelink grant, the TX UE triggers TX carrier or resource reselection for transmission(s) of a single MAC PDU and clears the resource from the configured sidelink grant while keeping the other resource(s) of the configured sidelink grant:

if a resource of the configured sidelink grant cannot accommodate a RLC SDU by using the maximum allowed MCS configured by upper layers in maxMCS-PSSCH and the MAC entity selects not to segment the RLC SDU (NOTE: If the configured sidelink grant cannot accommodate the RLC SDU, it is left for UE implementation whether to perform segmentation or sidelink resource reselection); or if transmission(s) with a resource of the configured sidelink grant cannot fulfil the latency requirement of the SL data in a logical channel according to the associated priority, and the MAC entity selects not to perform transmission(s) corresponding to a single MAC PDU (NOTE: If the latency requirement is not met, it is left for UE implementation whether to perform transmission(s) corresponding to single MAC PDU or sidelink resource reselection); or if sidelink transmission (for either LTE V2X communication or NR communication) is scheduled by the other UE with a higher priority than the priority of the logical channel and expected to overlap with a resource of the configured sidelink grant, and a measured result on SL-RSRP associated with the sidelink transmission is higher than threshold; or if sidelink transmission (for either LTE V2X communication or NR communication) is scheduled by the other UE with a higher priority than the priority of the logical channel and expected to overlap with a resource of the configured sidelink grant, and the UE cannot simultaneously receive the sidelink transmission scheduled by the other UE and perform a sidelink transmission on the resource of the configured sidelink grant; or if LTE or NR uplink transmission is scheduled for a MAC PDU of the highest logical channel priority which has a higher priority than either a threshold or the priority of the logical channel and expected to overlap with a SL resource of the configured sidelink grant, and the UE cannot simultaneously perform the uplink transmission and a sidelink transmission on the resource of the configured sidelink grant at the same time; or if one or more retransmission resources of the configured sidelink grant on the carrier are still available for next retransmission(s) of the MAC PDU that was considered as successfully transmitted (e.g. due to reception of a positive acknowledgement to a transmission of a MAC PDU); or if sidelink transmission (for either LTE V2X communication or NR communication) is scheduled by the NG-RAN with a higher priority than the priority of the logical channel and expected to overlap with a SL resource of the configured sidelink grant, and the UE cannot simultaneously perform the sidelink transmission scheduled by the NG-RAN and perform a sidelink transmission on the resource of the configured sidelink grant at the same time;

Upon triggering TX carrier or resource reselection for transmission(s) of a single MAC PDU in step S1926, the TX UE may reserve one or more resources for transmission(s) of a single MAC PDU.

The one of the resources may be used for new transmission of a single MAC PDU while the other resource(s) may be used for retransmission(s) of the MAC PDU.

The one of the resources used for new transmission may be added to the configured sidelink grant.

The TX UE may create a data unit based on the grant(s) and performs one or more transmissions from a HARQ process towards a receiving node by using the grant(s).

The receiving node may be either another UE or a base station such as gNB or eNB. If the receiving node is another UE, the transmission may be performed in sidelink. If the receiving node is the base station, the transmission may be performed in uplink.

The data unit may be a MAC PDU.

For example, in step S1928, the TX UE performs UL transmission to the base station by using the UL grant(s) received in step S1924.

For example, in step S1930, the TX UE performs a transmission of MAC PDU #2 to the RX UE. In step S1932, the RX UE transmits (positive) ACK for the transmission of MAC PDU #2 to the TX UE.

For example, in step S1934, the TX UE receives sidelink transmission from the RX UE. In step S1936, the TX UE transmits (positive) ACK for the sidelink transmission to the RX UE.

Furthermore, when the UE detects that one of the following conditions is met for a resource of the configured grant, the UE may trigger TX carrier or resource reselection for transmissions of multiple MAC PDUs and clears the configured grant (i.e., all resources of the configured grant):

if SL_RESOURCE_RESELECTION_COUNTER=0 and when SL_RESOURCE_RESELECTION_COUNTER was equal to 1 the MAC entity randomly selected, with equal probability, a value in the interval [0, 1] which is above the probability configured by upper layers in probResourceKeep; or if neither transmission nor retransmission has been performed by the MAC entity on any resource indicated in the configured sidelink grant during a time interval; or if sl-ReselectAfter is configured and the number of consecutive unused transmission opportunities on resources indicated in the configured sidelink grant is equal to sl-ReselectAfter; or if there is no configured sidelink grant on the carrier which is mapped to the logical channel, QoS requirement of the logical channel, the destination of the logical channel, or the cast type of the logical channel; or if there is no configured sidelink grant on the carrier for which HARQ feedback is enabled, in case that HARQ feedback is enabled for the logical channel; or if there is no configured sidelink grant on the carrier for which HARQ feedback is disabled, in case that HARQ feedback is disabled for the logical channel; or if there is no configured sidelink grant on the carrier for which the MCS level is supported, in case that the MCS level is configured for the logical channel; or if there is no configured sidelink grant on the carrier for which the cast type is supported, in case that the cast type (i.e., one or more of unicast, groupcast and broadcast) is configured for the logical channel; or if a pool of resources is configured or reconfigured by upper layers For the sake of convenience, FIG. 19 shows sidelink data transmission, but this is only exemplary. Implementations of the present disclosure shown in FIG. 19 is not limited to the sidelink data transmission, but can also be applied to TX carrier or resource reselection for the uplink data transmission as well. That is, the present disclosure can also be applied to HARQ transmission and/or retransmissions of a MAC PDU in uplink. In this case, the RX UE in FIG. 19 can be replaced by the same or a different base station.

Furthermore, according to implementations of the present disclosure shown in FIG. 19, an example of a method performed by a RX UE (e.g., second wireless device) may be as follows.

The second wireless device receives a first MAC PDU from a first wireless device using at least one resource from a first set of resources corresponding to the first MAC PDU among multiple sets of resources.

The second wireless device transmits a positive acknowledgement for the first MAC PDU to the first wireless device. Remaining resources from the first set of resources corresponding to the first MAC PDU are cleared.

The second wireless device receives a second MAC PDU from the first wireless device using at least one resource from a second set of resources corresponding to the second MAC PDU among the multiple sets of resources.

Furthermore, the method in perspective of the second wireless device described above may be performed by second wireless device 200 shown in FIG. 7, the wireless device 100 shown in FIG. 8, the second wireless device 200 shown in FIG. 9 and/or the UE 100 shown in FIG. 10.

More specifically, the second wireless device comprises at least one transceiver, at least processor, and at least one computer memory operably connectable to the at least one processor and storing instructions that, based on being executed by the at least one processor, perform operations comprising receiving a first MAC PDU from a first wireless device using at least one resource from a first set of resources corresponding to the first MAC PDU among multiple sets of resources, transmitting a positive acknowledgement for the first MAC PDU to the first wireless device, wherein remaining resources from the first set of resources corresponding to the first MAC PDU are cleared, and receiving a second MAC PDU from the first wireless device using at least one resource from a second set of resources corresponding to the second MAC PDU among the multiple sets of resources.

The present disclosure can have various advantageous effects.

For example, retransmission of a data unit upon reception of a positive acknowledgement for the data unit can be avoided.

For example, a UE performing HARQ transmission of a packet by using radio resources can dynamically and efficiently allocate resources for retransmissions of the packet.

For example, a UE can dynamically and efficiently allocate resources for retransmissions of the packet by considering service characteristics and/or requirements.

For example, a UE can dynamically and efficiently allocate resources for retransmissions of the packet in particular when packets from various services are multiplexed into a single data unit.

For example, the system can provide dynamic and efficient allocation of resources for data retransmissions for a UE performing HARQ transmission.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device adapted to operate in a wireless communication system, the method comprising:

i) if a media access control (MAC) entity of the wireless device has been configured with a sidelink resource allocation mode 2 to transmit using pools of resources in a carrier, and ii) if the MAC entity of the wireless device has selected to create a selected sidelink grant corresponding to transmissions of multiple MAC protocol data units (PDUs), and sidelink (SL) data is available in a logical channel, considering a set of periodic resources spaced by a resource reservation interval as a selected sidelink grant;

performing a transmission of a first MAC PDU according to the selected sidelink grant;

if the selected sidelink grant is available for a retransmission of the first MAC PDU which has been positively acknowledged, clearing physical sidelink control channel (PSCCH) durations and physical sidelink shared channel (PSSCH) durations corresponding to retransmissions of the first MAC PDU from the selected sidelink grant; and performing a transmission of a second MAC PDU according to the selected sidelink grant.

2. The method of claim 1, wherein the set of periodic resources includes a first set of periodic resources and a second set of periodic resources.

3. The method of claim 2, wherein the first set of periodic resources is associated to the transmission of the first MAC PDU, and wherein the second set of periodic resources is associated to the transmission of the second MAC PDU.

4. The method of claim 3, wherein clearing the PSCCH durations and the PSSCH durations corresponding to retransmissions of the first MAC PDU from the selected sidelink grant comprises clearing retransmission resources from the first set of periodic resources remaining after performing the transmission of the first MAC PDU which has been positively acknowledged.

5. The method of claim 2, wherein the second set of periodic resources is kept in the selected sidelink grant after clearing the PSCCH durations and the PSSCH durations corresponding to retransmissions of the first MAC PDU from the selected sidelink grant.

6. A wireless device adapted to operate in a wireless communication system, the wireless device comprising:
   at least one transceiver;
   at least one processor; and
   at least one computer memory operably connectable to the at least one processor and storing instructions that, based on being executed by the at least one processor, perform operations comprising:
   i) if a media access control (MAC) entity of the wireless device has been configured with a sidelink resource allocation mode 2 to transmit using pools of resources in a carrier, and ii) if the MAC entity of the wireless device has selected to create a selected sidelink grant corresponding to transmissions of multiple MAC protocol data units (PDUs), and sidelink (SL) data is available in a logical channel, considering a set of periodic resources spaced by a resource reservation interval as a selected sidelink grant;
   performing a transmission of a first MAC PDU according to the selected sidelink grant;
   if the selected sidelink grant is available for a retransmission of the first MAC PDU which has been positively acknowledged, clearing physical sidelink control channel (PSCCH) durations and physical sidelink shared channel (PSSCH) durations corresponding to retransmissions of the first MAC PDU from the selected sidelink grant; and
   performing a transmission of a second MAC PDU according to the selected sidelink grant.

7. The wireless device of claim 6, wherein the set of periodic resources includes a first set of periodic resources and a second set of periodic resources.

8. The wireless device of claim 7, wherein the first set of periodic resources is associated to the transmission of the first MAC PDU, and wherein the second set of periodic resources is associated to the transmission of the second MAC PDU.

9. The wireless device of claim 8, wherein clearing the PSCCH durations and the PSSCH durations corresponding to retransmissions of the first MAC PDU from the selected sidelink grant comprises clearing retransmission resources from the first set of periodic resources remaining after performing the transmission of the first MAC PDU which has been positively acknowledged.

10. The wireless device of claim 7, wherein the second set of periodic resources is kept in the selected sidelink grant after clearing the PSCCH durations and the PSSCH durations corresponding to retransmissions of the first MAC PDU from the selected sidelink grant.

11. A processing apparatus adapted to control a wireless device in a wireless communication system, the processing apparatus comprising:
    at least one processor; and
    at least one computer memory operably connectable to the at least one processor,
    wherein the at least one processor is configured to perform operations comprising:
    i) if a media access control (MAC) entity of the wireless device has been configured with a sidelink resource allocation mode 2 to transmit using pools of resources in a carrier, and ii) if the MAC entity of the wireless device has selected to create a selected sidelink grant corresponding to transmissions of multiple MAC protocol data units (PDUs), and sidelink (SL) data is available in a logical channel, considering a set of periodic resources spaced by a resource reservation interval as a selected sidelink grant;
    performing a transmission of a first MAC PDU according to the selected sidelink grant;
    if the selected sidelink grant is available for a retransmission of the first MAC PDU which has been positively acknowledged, clearing physical sidelink control channel (PSCCH) durations and physical sidelink shared channel (PSSCH) durations corresponding to retransmissions of the first MAC PDU from the selected sidelink grant; and
    performing a transmission of a second MAC PDU according to the selected sidelink grant.

12. The processing apparatus of claim 11, wherein the set of periodic resources includes a first set of periodic resources and a second set of periodic resources.

13. The processing apparatus of claim 12, wherein the first set of periodic resources is associated to the transmission of the first MAC PDU, and wherein the second set of periodic resources is associated to the transmission of the second MAC PDU.

14. The processing apparatus of claim 13, wherein clearing the PSCCH durations and the PSSCH durations corresponding to retransmissions of the first MAC PDU from the selected sidelink grant comprises clearing retransmission resources from the first set of periodic resources remaining after performing the transmission of the first MAC PDU which has been positively acknowledged.

15. The processing apparatus of claim 12, wherein the second set of periodic resources is kept in the selected sidelink grant after clearing the PSCCH durations and the PSSCH durations corresponding to retransmissions of the first MAC PDU from the selected sidelink grant.

* * * * *